(12) United States Patent
Kim et al.

(10) Patent No.: US 11,376,738 B2
(45) Date of Patent: Jul. 5, 2022

(54) ROBOT

(71) Applicant: LG ELECTRONICS INC., Seoul (KR)

(72) Inventors: Nakyeong Kim, Seoul (KR); Sungjin Kim, Seoul (KR); Sungmin Moon, Seoul (KR); Sanghak Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 328 days.

(21) Appl. No.: 16/577,474

(22) Filed: Sep. 20, 2019

(65) Prior Publication Data

US 2020/0009737 A1    Jan. 9, 2020

(30) Foreign Application Priority Data

Aug. 28, 2019  (KR) .......................... 10-2019-0106046

(51) Int. Cl.
*B25J 9/16*     (2006.01)
*B25J 11/00*    (2006.01)

(52) U.S. Cl.
CPC ............. *B25J 9/1679* (2013.01); *B25J 11/00* (2013.01)

(58) Field of Classification Search
CPC ...................................... B25J 9/06; B25J 11/00
See application file for complete search history.

(56) References Cited

U.S. PATENT DOCUMENTS

| 4,685,569 | A | * | 8/1987 | Osaki | G01N 27/60 209/571 |
| 5,305,918 | A | * | 4/1994 | D'Andrade | B05B 9/0426 222/401 |
| 6,843,166 | B1 | * | 1/2005 | Li | A47J 27/14 99/327 |
| 2004/0148056 | A1 | * | 7/2004 | Baranowski | G01G 13/24 700/240 |
| 2005/0193901 | A1 | * | 9/2005 | Buehler | A47J 44/00 99/468 |
| 2011/0108569 | A1 | * | 5/2011 | Jones | A23G 9/228 222/1 |
| 2015/0114236 | A1 | * | 4/2015 | Roy | A47J 44/00 426/231 |
| 2016/0059412 | A1 | * | 3/2016 | Oleynik | B25J 19/02 700/257 |
| 2016/0213054 | A1 | * | 7/2016 | Vardakostas | A21C 15/002 |
| 2018/0127192 | A1 | * | 5/2018 | Cohen | G07F 11/1657 |

* cited by examiner

*Primary Examiner* — Kira Nguyen
(74) *Attorney, Agent, or Firm* — Birch, Stewart, Kolasch & Birch, LLP

(57) ABSTRACT

A robot includes a robot body, an ingredient feeder installed in the robot body to feed an ingredient, first and second robot arms each having an ingredient channel formed therein and connected to the robot body, the ingredient passing through the ingredient channel, and a dispenser disposed in the robot body to dispense the ingredient received from the ingredient feeder to the first and second robot arms. The dispenser includes a common channel connected to the ingredient feeder, a first branch channel communicating with the ingredient channel of the first robot arm, and a second branch channel communicating with the ingredient channel of the second robot arm, and the ingredient, which has passed through the common channel, is selectively fed to the first branch channel and the second branch channel by the dispenser.

18 Claims, 10 Drawing Sheets

ROBOT

CROSS-REFERENCE TO RELATED APPLICATIONS

This application claims the benefit of priority to Korean Patent Application No. 10-2019-0106046, filed in the Korean Intellectual Property Office on Aug. 28, 2019, the entire contents of which are incorporated herein by reference.

FIELD OF THE DISCLOSURE

The present disclosure relates to a robot system and a control method of the same.

Robots are machines that automatically process given tasks or operate with their own capabilities. The application fields of robots are generally classified into industrial robots, medical robots, aerospace robots, and underwater robots. Recently, communication robots that can communicate with humans by voices or gestures have been increasing.

SUMMARY

Embodiments provide a robot capable of rapidly introducing ingredients into an ingredient container while minimizing contamination of processed ingredients in an ingredient feeder.

In one embodiment, a robot includes a robot body, an ingredient feeder installed in the robot body to feed an ingredient, first and second robot arms each having an ingredient channel formed therein and connected to the robot body, the ingredient passing through the ingredient channel, and a dispenser disposed in the robot body to dispense the ingredient received from the ingredient feeder to the first and second robot arms. The dispenser includes a common channel connected to the ingredient feeder, a first branch channel communicating with the ingredient channel of the first robot arm, and a second branch channel communicating with the ingredient channel of the second robot arm, and the ingredient, which has passed through the common channel, is selectively fed to the first branch channel and the second branch channel by the dispenser.

Each of the first branch channel and the second branch channel may include an inclined channel having an inlet formed therein, and a horizontal channel extending from the inclined channel in a horizontal direction.

An inlet of each of the first branch channel and the second branch channel may be located below the common channel.

A horizontal length between an outlet of the first branch channel and an outlet of the second branch channel may be greater than a horizontal length of the ingredient feeder.

An outlet of the first branch channel and an outlet of the second branch channel may face in opposite directions.

The dispenser may further include a variable ingredient guide configured to enable the first branch channel and the second branch channel to selectively communicate with the common channel and guide the ingredient, which has passed through the common channel, to the first branch channel or the second branch channel.

The variable ingredient guide may include a guide plate configured to block any one of the first branch channel or the second branch channel and guide the ingredient dropped from the common channel to the other of the first branch channel or the second branch channel, and a rotator configured to rotate the guide plate.

The dispenser may further include a center guide located below the common channel and having a first inclined surface and a second inclined surface formed therein, the first inclined surface and the second inclined surface guiding the ingredient dropped from the common channel in opposite directions.

The guide plate may be rotatably disposed above the center guide.

The rotator may rotate the guide plate in an obtuse angle range.

The first branch channel and the second branch channel may be connected via a center connector, and an assembly of the first branch channel, the second branch channel and the center connector may be movably disposed in the robot body.

The robot may include a mover configured to move the assembly to a first position where the first branch channel communicates with the common channel or a second position where the second branch channel communicates with the common channel.

The mover may be connected to the first branch channel or the second branch channel.

The robot may further include a water tank disposed in the robot body, and a pump configured to pump water of the water tank to the ingredient feeder.

The robot may further include a battery disposed in the robot body.

The robot may further include a driving wheel disposed below the robot body.

The ingredient feeder may further include a blower configured to feed a solid ingredient to the common channel.

A cross-sectional area of each of the first branch channel and the second branch channel may be less than a cross-sectional area of the common channel.

In another embodiment, a method of controlling a robot may include a robot including an ingredient feeder installed in a robot body to feed an ingredient, first and second robot arms connected to the robot body and each having formed therein an ingredient channel, through which the ingredient passes, and a dispenser configured to dispense the ingredient received from the ingredient feeder to the first and second robot arms.

An example of the method of controlling the robot includes processing different types of first and second ingredients, the dispenser guiding the first ingredient to the ingredient channel of the first robot arm by the ingredient feeder, and guiding the second ingredient to the ingredient channel of the second robot arm.

Another example of the method of controlling the robot includes the ingredient feeder processing the ingredient, and performing cooking operation by any one of the first robot arm or the second robot arm and guiding the ingredient to the other of the first robot arm or the second robot arm.

DETAILED DESCRIPTION OF THE EMBODIMENTS

Hereinafter, preferred embodiments of the present disclosure will be described in detail with reference to the drawings.

Figure 1:
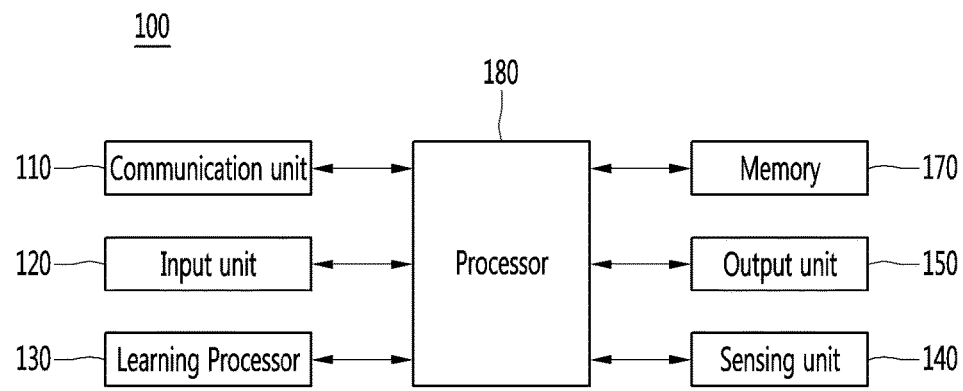
FIG. 1 is a view illustrating an AI device constituting a robot system according to an embodiment.
Figure 2:
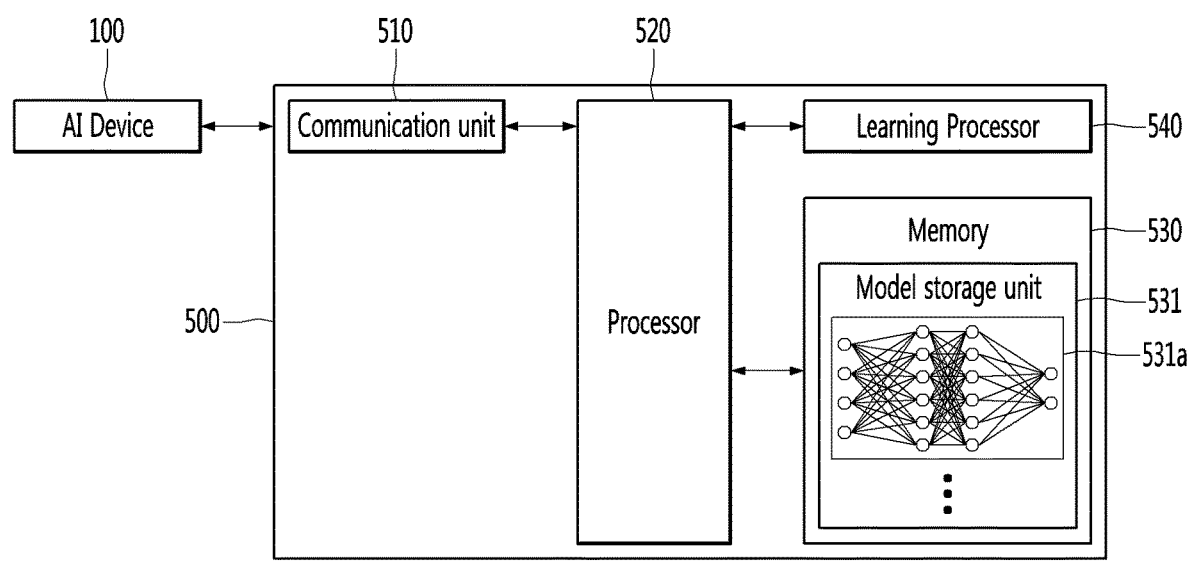
FIG. 2 is a view illustrating an AI server of a robot system according to an embodiment.
Figure 3:
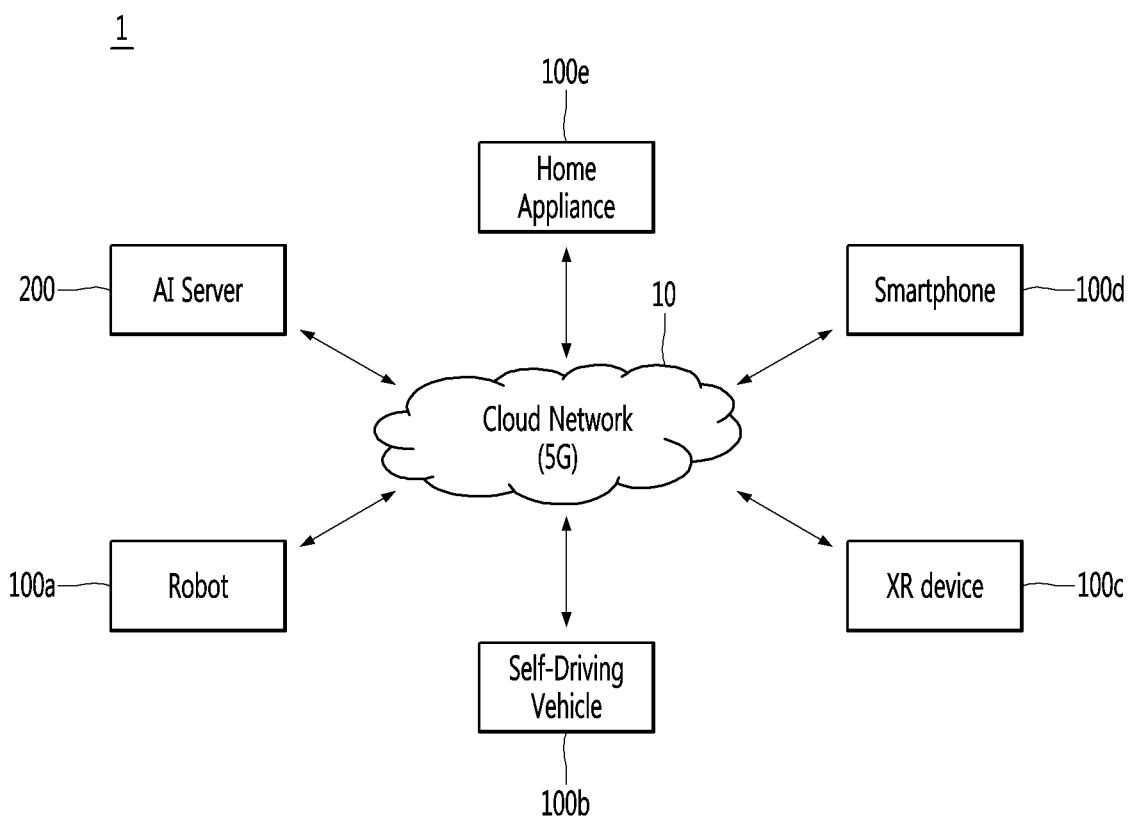
FIG. 3 is a view illustrating an AI system to which a robot system according to an embodiment is applied.

FIG. 1 is a view illustrating an AI device constituting a robot system according to an embodiment, FIG. 2 is a view illustrating an AI server of a robot system according to an embodiment and FIG. 3 is a view illustrating an AI system to which a robot system according to an embodiment is applied.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 500 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NEC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 540 of the AI server 500.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 540 of the AI server 500, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 500. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

FIG. 2 illustrates an AI server 500 connected to a robot according to an embodiment of the present disclosure.

Referring to FIG. 2, the AI server 500 may refer to a device that learns an artificial neural network by using a machine learning algorithm or uses a learned artificial neural network. The AI server 500 may include a plurality of servers to perform distributed processing, or may be defined as a 5G network. At this time, the AI server 500 may be included as a partial configuration of the AI device 100, and may perform at least part of the AI processing together.

The AI server 500 may include a communication unit 510, a memory 530, a learning processor 540, a processor 520, and the like.

The communication unit 510 can transmit and receive data to and from an external device such as the AI device 100.

The memory 530 may include a model storage unit 531. The model storage unit 531 may store a learning or learned model (or an artificial neural network 531a) through the learning processor 540.

The learning processor 540 may learn the artificial neural network 531a by using the learning data. The learning model may be used in a state of being mounted on the AI server 500 of the artificial neural network, or may be used in a state of being mounted on an external device such as the AI device 100.

The learning model may be implemented in hardware, software, or a combination of hardware and software. If all or part of the learning models is implemented in software, one or more instructions that constitute the learning model may be stored in memory 530.

The processor 520 may infer the result value for new input data by using the learning model and may generate a response or a control command based on the inferred result value.

FIG. 3 illustrates an AI system 1 according to an embodiment of the present disclosure.

Referring to FIG. 3, in the AI system 1, at least one of an AI server 500, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 500 configuring the AI system 1 may be connected to each other through the cloud network 10. In particular, each of the devices 100a to 100e and 500 may communicate with each other through a base station, but may directly communicate with each other without using a base station.

The AI server 500 may include a server that performs AI processing and a server that performs operations on big data.

The AI server 500 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 500 may learn the artificial neural network according to the machine learning algorithm instead of the AI devices 100a to 100e, and may directly store the learning model or transmit the learning model to the AI devices 100a to 100e.

At this time, the AI server 500 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 500.

At this time, the robot 100a may perform the operation by generating the result by directly using the learning model, but the sensor information may be transmitted to the external device such as the AI server 500 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
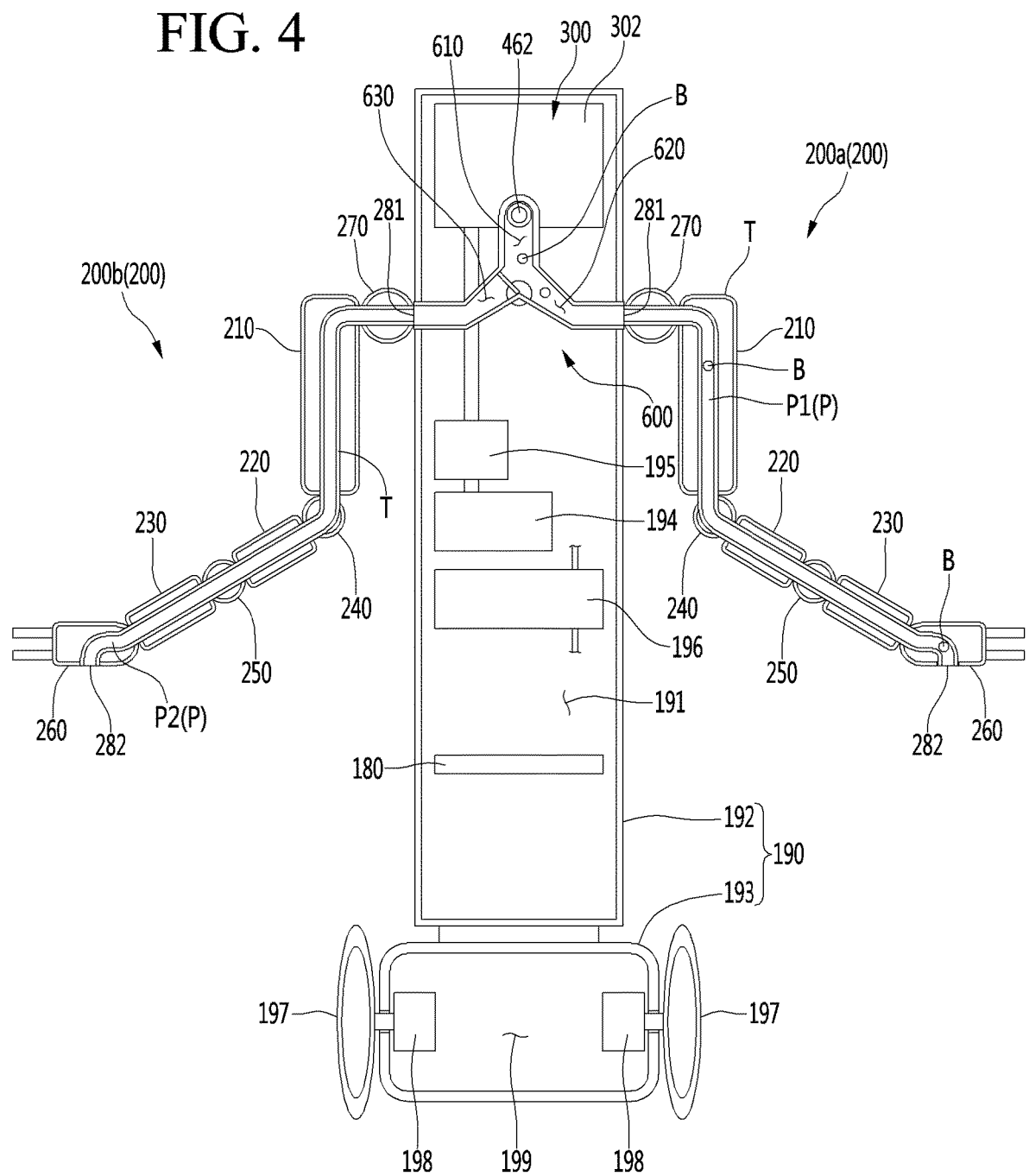
FIG. 4 is a front view showing a robot according to an embodiment.
Figure 5:
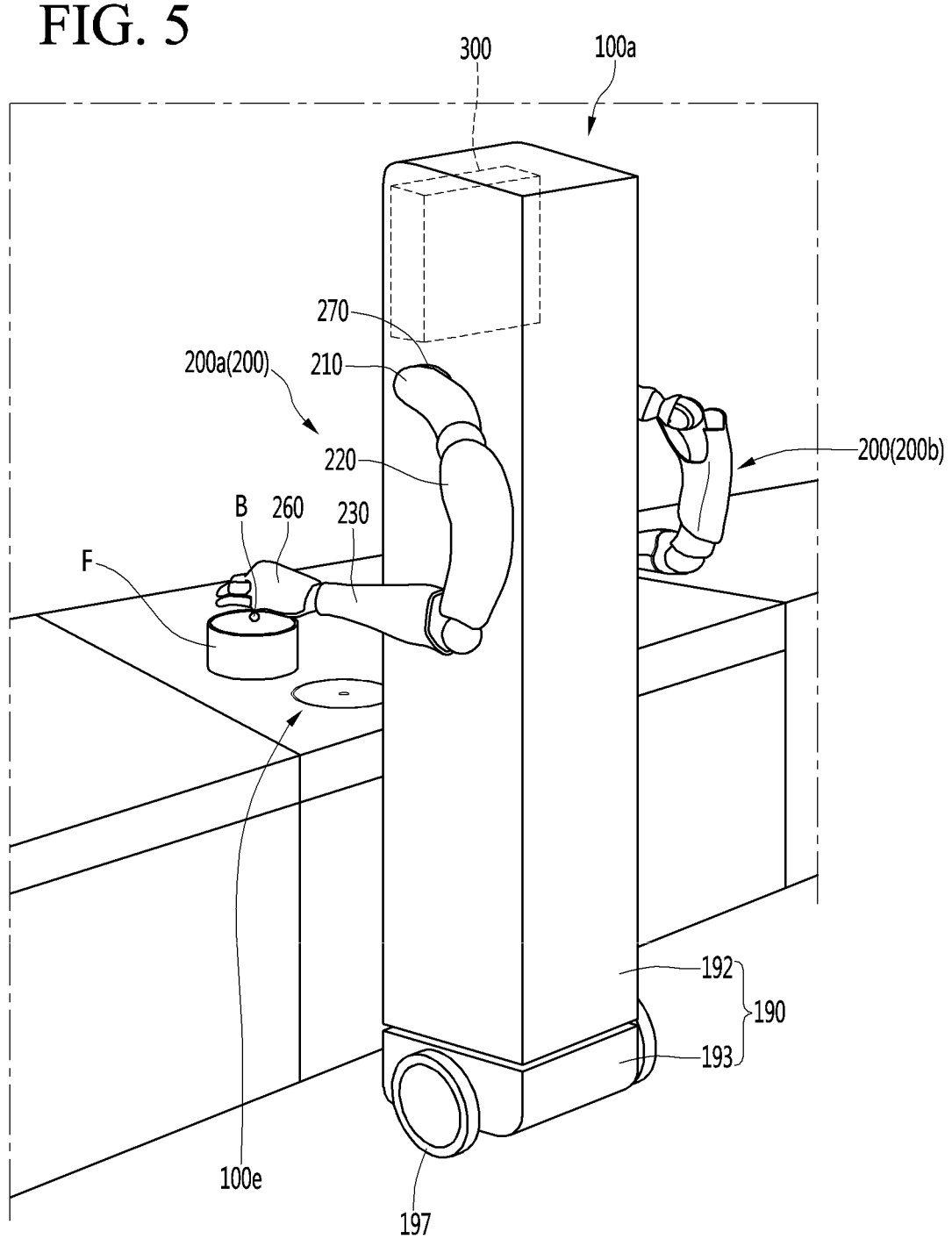
FIG. 5 is a view showing the case where a robot arm shown in FIG. 4 introduces an ingredient into an ingredient container.

FIG. 4 is a front view showing a robot according to an embodiment, and FIG. 5 is a view showing the case where a robot arm shown in FIG. 4 introduces an ingredient into an ingredient container.

The robot may include a robot body 190, first and second robot arms 200a and 200b, an ingredient feeder 300 and a dispenser 600.

The robot shown in FIGS. 4 and 5 may be a chef robot capable of performing various cooking-related operations in a kitchen or restaurant in which a cooking device 100e, a fixed chef robot fixedly located in a kitchen or restaurant or a mobile chef robot capable of performing cooking operation while moving in a kitchen or restaurant.

The robot may process the ingredient in the ingredient feeder 300 and then introduce the processed ingredient into a cooking container F through at least one of the first and second robot arms 200a and 200b, and may be configured to perform various cooking operations by the first and second robot arms 200a and 200b. Such a robot may be an integral chef robot capable of processing and introducing the ingredient and performing cooking using the ingredient.

The robot body 190 may form the appearance of the robot. A space 191 in which the ingredient feeder 300 and the dispenser 600 are received may be formed in the robot body 190.

The first and second robot arms 200a and 200b may be connected to the robot body 190 to perform various cooking-related operations.

The ingredient feeder 300 may supply the ingredient to the dispenser 600. The ingredient feeder 300 may process the ingredient used for cooking into a shape or size suitable for cooking and supply the processed ingredient to the dispenser 600.

The dispenser 600 may dispense the ingredient such that the ingredient supplied from the ingredient feeder 300 is selectively supplied to the first robot arm 200a and the second robot arm 200b.

The robot may further include a water tank 194 disposed in the robot body 190 and a pump 195 for pumping water of the water tank to the ingredient feeder 300.

The pump 195 may be connected to the water tank 194 through a pump inlet line and may be connected to the ingredient feeder 300 through a pump outlet line. The pump outlet line may connect the pump 195 with the below-described processors 310, 320 and 333 of the ingredient feeder, and particularly, guide the water of the water tank 194 to the below-described water tubes 314, 324 and 334 of the processors 310, 320 and 333.

When the robot includes the water tank 194 and the pump 195, the ingredient feeder 300 does not need to be always connected to a drinking fountain such as a faucet, and the robot does not need to move to the vicinity of the drinking fountain in order to receive water from the drinking fountain, receives water from the water tank 194 disposed in the robot, and uses water to process the ingredient.

The robot may further include a battery 196 disposed in the robot body 190. The robot may further include driving wheels 197 located below the robot body 190. The robot may further include a driving motor 198 for generating driving force for rotating the driving wheels 197.

When the robot includes the driving wheels 197 and the driving motor 198, it is possible to perform various cooking operations while moving in a kitchen or restaurant, to maximize an area where the robot can perform cooking operation, and to diversify the types of cooking operations capable of being performed by the robot as compared to the case where the robot is fixed.

The robot may move to a charging station (not shown) in order to charge the battery 196.

Hereinafter, components configuring the robot will be described in detail.

The robot body 190 may include an assembly of a plurality of members. The robot body 190 may include a main body 192 having a space 191 formed therein and a lower body 193 formed below the main body 192 and having a space 199 formed therein.

The main body 192 may be disposed to be rotated or lifted up or down relative to the lower body 193.

The water tank 194, the pump 195, the ingredient feeder 300 and the dispenser 600 may be received in the space 191 of the main body 192.

The water tank 194 and the pump 195 may supply water to the ingredient feeder 300 and, when the pump 195 is driven, the water of the water tank 194 may be supplied to the ingredient feeder 300 and used in the ingredient feeder 300.

Current of the battery 196 may be applied to the pump 195, the driving motor 198, the ingredient feeder 300, and the dispenser 600. The battery 196 may be received in the space 191 of the main body 192 or the space 199 of the lower body 193.

The driving motor 198 may be received in the space 199 of the lower body 193. The driving motor 198 may be directly connected to the driving wheels 197 to rotate the driving wheels 197 forward and backward. The robot may further include a power transmission member such as a reducer disposed between the driving motor 198 and the driving wheels 197, and the driving motor 198 and the reducer may rotate the driving wheels 197 forward and backward.

The ingredient feeder 300 may be installed in the robot body 190. The ingredient feeder 300 may be received in the space 191 formed in the robot body 190. The ingredient feeder 300 may feed the ingredient to the dispenser 600. The ingredient feeder 300 may include the ingredient port 462 for discharging the ingredient, and the ingredient which has passed through the ingredient port 462 may be introduced into the dispenser 600. The ingredient feeder 300 will be described in detail with reference to FIG. 5.

The dispenser 600 may dispense the ingredient such that the ingredient supplied from the ingredient feeder 300 is selectively fed to the first robot arm 200a or the second robot arm 200b.

The dispenser 600 may include a common channel 610 connected to the ingredient feeder 300; a first branch channel 620 communicating with the ingredient channel P1 of the first robot arm 200a; and a second branch channel 630 communicating with the ingredient channel P2 of the second robot arm 200b.

The common channel 610 may communicate with the ingredient port 462 of the ingredient feeder 300.

The ingredient port 462 of the ingredient feeder 300 may face the common channel 610, and the ingredient, which has passed through the ingredient port 462 of the ingredient feeder 300, may be introduced into the common channel 610 and may pass through the common channel 610.

The ingredient, which has passed through the common channel 610, may be fed to the first branch channel 610 or the second branch channel 620 by the dispenser 600.

The first and second robot arms 200a and 200b may be connected to the robot body 190 to be spaced apart from each other. When the first robot arm 200a is connected to the left side of the robot body 190, the second robot arm 200b may be connected to the right side of the robot body 190. The first robot arm 200a and the second robot arm 200b may be spaced apart from each other with the robot body 190 interposed therebetween. The first robot arm 200a and the second robot arm 200b may operate independently of each other.

The first robot arm 200a and the second robot arm 200b may have the same structure and the first robot arm 200a and the second robot arm 200b may be symmetrically disposed.

Hereinafter, for the common configuration of the first and second robot arms 200a and 200b, the robot arm 200 will be representatively described.

The robot arm 200 may perform various cooking operations including ingredient introduction operation in a state of being connected to the robot body 190 and, particularly, the main body 192.

An ingredient channel P, through which the ingredient passes, may be formed in each of the first and second robot arms 200a and 200b. A first ingredient channel P1 may be formed in the first robot arm 200a and a second ingredient channel P2 may be formed in the second robot arm 200b. The first ingredient channel P1 and the second ingredient channel P2 may have the same shape and size. Hereinafter, for the common configuration of the first ingredient channel P1 and the second ingredient channel P2, the ingredient channel P will be representatively described.

The robot arm 200 may receive the ingredient from the dispenser 600, and the ingredient received from the dispenser 600 may be dropped into the cooking container F after passing through the ingredient channel P.

The robot arm 200 may operate such that the ingredient outlet 282 of the ingredient channel P faces the inside of the cooking container F at the time of introducing the ingredient.

The ingredient processed in the ingredient feeder 300 may be guided to the cooking container F after passing through the dispenser 600 and the robot arm 200, the ingredient may be cleanly introduced into the cooking container F, and splashing or dropping of the ingredient around the cooking container F may be minimized. That is, the ingredient processed in the ingredient feeder 300 may be accurately introduced into the cooking container F and the vicinity of the cooking container F may be kept clean.

The ingredient channel P may be a passage through which the ingredient passes, and the ingredient may be introduced into the ingredient channel P through one side of the ingredient channel P and may be discharged from the ingredient channel P through the other side of the ingredient channel P.

In the robot arm 200, for various cooking operations, an end effector 260 may be connected to arms 210, 220 and 230. In addition, the ingredient channel P may be provided inside the arms 210, 220 and 230 and the end effector 260.

The robot arm 200 may perform various cooking operations in addition to the ingredient introduction operation.

Examples of the various cooking operations performed by the robot arm 200 may include the robot arm 200 operating the cooking device 100*e* around the cooking device 100*e*, the robot arm 200 stirring food contained in the cooking container F, or the robot arm 200 moving the completed food from the cooking container F to another container such as a dish.

The robot arm 200 may include a plurality of arms 210, 220 and 230 and at least one arm connectors 240 and 250 for connecting the plurality of arms to perform the various cooking operations. The plurality of arms 210, 220 and 230 may be sequentially disposed with the arm connectors 240 and 250 interposed therebetween.

The robot arm 200 may further include the end effector 260 installed in any one of the plurality of arms 210, 220 and 230.

The end effector 260 may be a robot hand or gripper, and may be installed on the distal end of the robot arm 200 such that the robot arm 200 performs various cooking-related functions (hereinafter referred to as cooking operations).

The robot arm 200 may include at least one motor or actuator capable of rotating the arms 210, 220 and 230, the arm connectors 240 and 250 and the end effector 260.

If the robot arm R configuring the robot arm 200 is capable of three-dimensionally moving and rotating the end effector 260, the shapes or numbers of arms 210, 220 and 230, arm connectors 240 and 250, and motor or actuator are not limited thereto and may be variously changed.

The robot arm 200 may further include a robot connector 270 for connecting another 210 of the plurality of arms 210, 220 and 230 to the robot body 190.

One end of the ingredient channel P may be an ingredient inlet 281, through which the ingredient is introduced into the ingredient channel P, and the other end of the ingredient channel P is the ingredient outlet 282, through which the ingredient guided to the ingredient channel P is discharged from the robot arm 200.

An opening may be formed in the robot arm 200 in the longitudinal direction of the robot arm 200. An example of the ingredient channel P may be formed by such an opening.

The openings may be formed in the robot connector 270, the arms 210, 220 and 230, the arm connectors 240 and 250 and the end effector 260, may be sequentially formed to communicate with each other in the longitudinal direction of the robot arm 200, and an example of the ingredient channel P may be formed by a combination of opening sequentially located in the longitudinal direction of the robot arm 200.

Another example of the ingredient channel P may be formed by a hose or a tube T (hereinafter referred to as a tube) disposed to penetrate through the opening formed in the robot arm 200. A whole or part of the tube T may be received in the opening formed in the robot arm 200, and the ingredient channel P may be defined as the inside of the tube.

The first ingredient channel P1 of the first robot arm 200*a* may be connected to the first branch channel 620, and the second ingredient channel P2 of the second robot arm 200*b* may be connected to the second branch channel 630.

The first branch channel 620 and the first ingredient channel P1 may be connected in the space 191 of the robot body 190 or the first robot arm 200*a*, and the ingredient inlet 281 of the first ingredient channel P2 may be connected to the first branch channel 620 in the space 191 of the robot body 190 or the first robot arm 200*a*.

The second branch channel 630 and the second ingredient channel P2 may be connected in the space 191 of the robot body 190 or the second robot arm 200*b*, and the ingredient inlet 281 of the second ingredient channel P2 may be connected to the second branch channel 630 in the space 191 of the robot body 190 or the second robot arm 200*b*.

The first and second robot arms 200*a* and 200*b* may cooperate with each other in a state of being spaced apart from each other, thereby performing the cooking operation. When one of the first and second robot arms 200*a* and 200*b* performs ingredient introduction operation, the other of the first and second robot arms 200*a* and 200*b* may perform cooking operation other than the ingredient introduction operation.

Any one of the first and second robot arms 200*a* and 200*b* may perform cooking operation other than the ingredient introduction operation and the other thereof may perform the ingredient introduction operation.

The first and second robot arms 200*a* and 200*b* may introduce different types of ingredients into the cooking container F during the whole cooking process, and independently introduce the ingredients into the cooking container F at different times during the whole cooking process.

The dispenser 600 may first feed a first ingredient to the first ingredient channel P1 of the first robot arm 200*a* and then feed a second ingredient different from the first ingredient to the second ingredient channel P2 of the second robot arm 200*b*. In this case, the first ingredient and the second ingredient may be introduced into the ingredient container F with a time difference during the whole cooking process.

For example, the first ingredient may be introduced into the cooking container F through the first ingredient channel P1 of the first robot arm 200*a* at the beginning of the whole cooking process, and the second ingredient may be introduced into the cooking container F through the second ingredient channel P2 of the second robot arm 200*b* at the end of the whole cooking process.

While the first ingredient passes through the first ingredient channel P1 of the first robot arm 200*a*, some of the first ingredient or the smell of the first ingredient may be left in the first ingredient channel P1, and the taste or smell of the second ingredient may be changed by some of the first ingredient or the smell of the first ingredient.

The robot may introduce the second ingredient such that the second ingredient is not mixed with the first ingredient, after the first ingredient is introduced. As described above, when the first ingredient and the second ingredient are introduced through different first and second robot arms 200*a* and 200*b* with a time difference, the robot may introduce the first ingredient and the second ingredient at optimal introduction times.

Hereinafter, the ingredient feeder will be described with reference to FIG. 6.

The ingredient feeder 300 may process the food ingredient into a size and a shape that is easy to transfer. For example, the ingredient feeder 300 may process the food ingredient into a ball-shaped solid ingredient B. The ingredient feeder 300 may supply the solid ingredient B to the ingredient channel P, and the solid ingredient B may be introduced into the cooking container F through the ingredient outlet 282 of the ingredient channel P by passing through the ingredient channel P.

The ingredient channel P may be configured to quickly guide the ingredient supplied from the ingredient feeder 300, and it is advantageous that the ingredient that comes out through the ingredient outlet 282 is not discharged at too high a speed.

In addition, the ingredient feeder 300 may process the ingredient into a size smaller than a sectional area of the ingredient channel P, and the ingredient processed by the ingredient feeder 300 to a size smaller than the sectional area of the ingredient channel P may come out of the robot arm 200 by passing through the ingredient channel (P).

Figure 6:
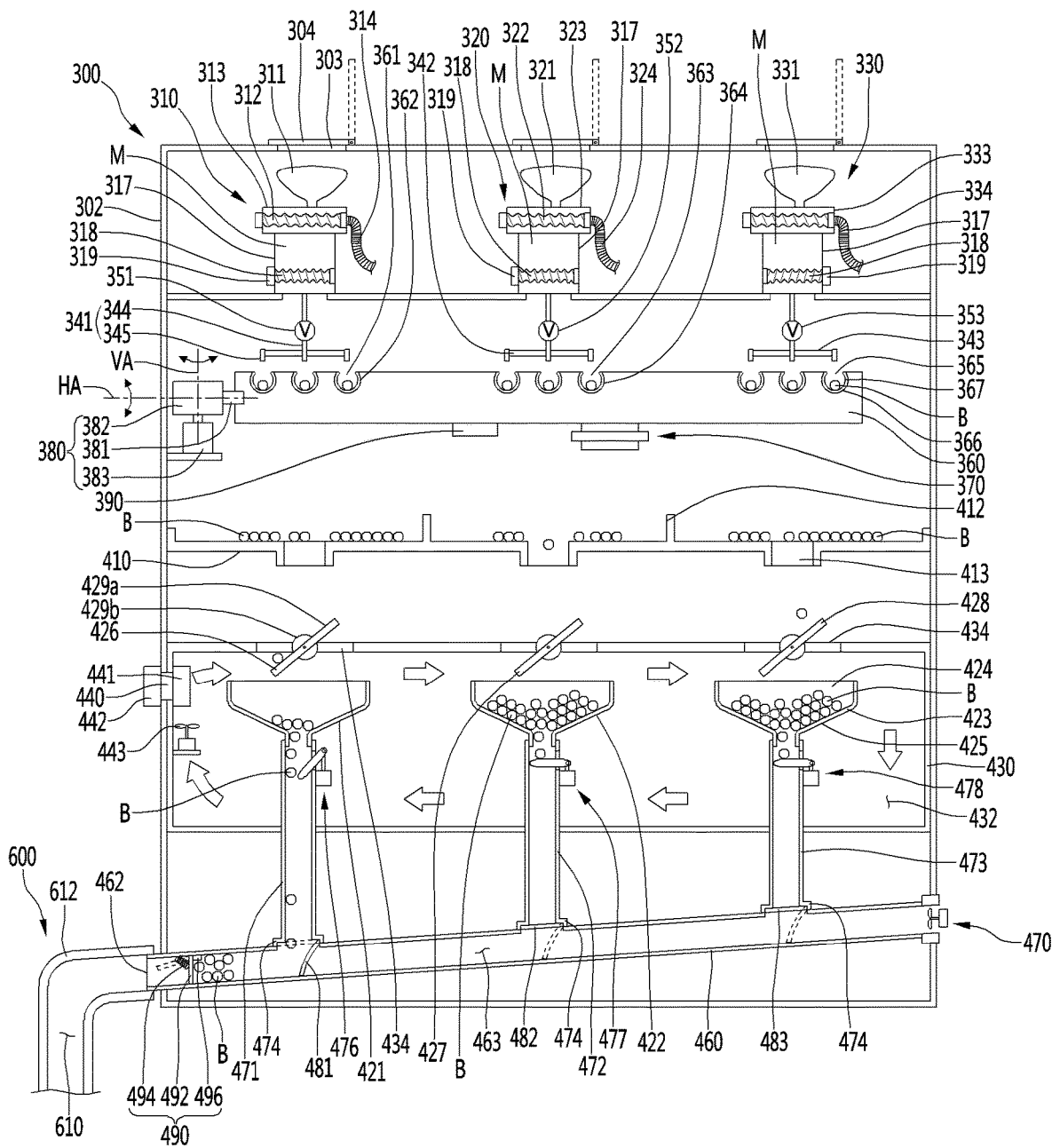
FIG. 6 is a view illustrating the inside of an ingredient feeder according to an embodiment.

FIG. 6 is a view illustrating the inside of the ingredient feeder according to an embodiment.

The food ingredient processed by the ingredient feeder 300 may be various ingredients required for food cooking. For example, the food ingredient may be a solid ingredient such as cucumber, carrot, onion, meat, red pepper, pepper, salt, or red pepper powder, or may be a liquid ingredient such as soy sauce, vinegar, and red pepper paste.

The solid ingredient may be classified into a powder ingredient such as pepper, salt and red pepper powder, and a general solid ingredient having a larger size than the powder ingredient. Examples of the general solid ingredient may be cucumber, carrot, onion, meat, and the like.

Among the solid ingredients, the solid ingredient having a smaller size than the ingredient channel P may be an ingredient that does not require grinding, and may be a powder ingredient such as pepper, salt, red pepper powder, and the like. In the following description, the above ingredients will be referred to as a powder ingredient for the sake of convenience.

The solid ingredient having a large size than the ingredient channel P in the solid ingredients may be an ingredient that needs to be ground to be processed to a size smaller than the sectional area of the ingredient channel P. For example, the solid ingredient having the large size than the ingredient channel P may be a general solid ingredient such as cucumber, carrot, onion, meat, etc. In the following description, these ingredients will be described as solid ingredients for the sake of convenience.

The ingredient feeder 300 may process a mixture M, in which the food ingredient is mixed with water, into the solid ingredient B, and supply the solid ingredient B to the ingredient channel P.

The ingredient feeder 300 may include at least one processor and an ingredient mold 360.

The ingredient feeder 300 may include an ingredient feeder case 302 forming an external appearance, and various components of the ingredient feeder 300 may be accommodated in the ingredient feeder case 302.

The ingredient feeder case 302 may be formed with an ingredient input port 303 for inputting the food ingredient from the outside. The ingredient feeder 300 may further include an ingredient input door 304 disposed in the ingredient feeder case 302 to open or close the ingredient input port 303. The ingredient input door 304 may be rotatably or slidably disposed in the ingredient feeder case 302 to open or close the ingredient input port 303. The ingredient input port 303 and the ingredient input door 304 may be provided for each processor.

The processor produces the mixture M by mixing the food ingredient with water and the processor may mix various food ingredients with water to primarily process into the mixture M of the ingredient and water.

The ingredient mold 360 may secondary process the mixture M produced by the processor into a solid ingredient B of a predetermined size and a predetermined shape.

The ingredient mold 360 may be spaced apart from the processor. The ingredient mold 360 may be formed with a space portion defining a space in which the mixture supplied from the processor is accommodated. The space portion may be formed in a shape recessed in the ingredient mold 360.

The mixture M produced by the processor may be supplied to the space portion and accommodated in the space portion and may be processed into the same or similar shape as the shape of the space portion in the space portion.

The ingredient feeder M may be provided with a plurality of processors 310, 320 and 330. The plurality of processors 310, 320 and 330 may process the same kind of food ingredient.

All or part of the plurality of processors 310, 320 and 330 may process different kinds of food ingredients. For example, one 310 of the plurality of processors 310, 320 and 330 may mix the solid ingredient with water, and another one 320 of the plurality of processors 310, 320 and 330 may mix the powdered ingredient with water, and another one 330 of the plurality of processors 310, 320 and 330 may mix the liquid ingredient with water.

The plurality of processors 310, 320 and 330 may include a solid ingredient processor 310 that produces a mixture by mixing the solid ingredient with water while grinding the solid ingredient. The plurality of processors 310, 320 and 330 may include a powder ingredient processor 320 for mixing the powder ingredient with water to produce a mixture. The plurality of processors 310, 320 and 330 may include a liquid ingredient processor 330 that mixes the liquid ingredient with water to produce a mixture.

The solid ingredient processor 310, the powder ingredient processor 320, and the liquid ingredient processor 330 may be provided in singular or plural in the ingredient feeder.

Each of the solid ingredient processor 310, the powder ingredient processor 320, and the liquid ingredient processor 330 may produce a mixture of food ingredients mixed with water. In the following description, the processors 310, 320 and 330 will be described when explaining the common configuration and the solid ingredient processor 310, the powder ingredient processor 320 and the liquid ingredient processor 330 will be distinguishably described when explaining the different configurations.

The processors 310, 320 and 330 may include a storage container 317 in which the produced mixture is contained, a rotating body 318 rotatably disposed in the storage container 317 to allow the mixture contained in the storage container to flow, and a motor 319 to rotate the rotating body 318.

The storage container 317, the rotating body 318 and the motor 319 may allow the mixture M to flow in the storage container 317 such that the mixture M may be kept in a shape of a slush or similar to the slush without being solidified.

The storage container 317, the rotating body 318 and the motor 319 may be provided regardless of the type of the processor and denoted with the same reference numerals regardless of the type of the processor.

The solid ingredient processor 310, which is one example of the processor, may include a solid ingredient inlet 311 into which solid ingredients are introduced from among the food ingredients, a grinder 311 configured to contain the solid ingredients introduced into the solid ingredient inlet 311 and provided therein with a grinding rotor 312 rotatably installed, a water tube 314 configured to guide water into the grinder, and a storage container 317 configured to contain a mixture of water and the solid ingredients, which are pulverized in the grinder 313, in the form of a slush. The rotating body 318 rotated by a motor 319 may be provided in the storage container 317.

The powder ingredient processor 320, which is another example of the processor, may include a powder ingredient inlet 321 into which powder ingredients having a size smaller than a size of solid ingredients are introduced from among the food ingredients, a mixer 323 configured to contain the powder ingredients introduced into the powder ingredient inlet 321, in which a conveying screw 322 is rotatably installed in the mixer 323, a water tube 324 configured to guide water into the mixer 323, and a storage container 317 configured to contain a mixture of liquid ingredients and the water mixed in the mixer 323. The rotating body 318 rotated by a motor 319 may be provided in the storage container 317.

The liquid ingredient processor 330, which is still another example of the processor, may include a liquid ingredient inlet 331 into which liquid ingredients are introduced from among the food ingredients, a mixer 333 configured to contain the liquid ingredients introduced into the liquid ingredient inlet 331, a water tube 334 configured to guide water into the mixer 333, and a storage container 317 configured to contain a mixture of the liquid ingredients and the water mixed in the mixer 333. The rotating body 318 rotated by a motor 319 may be provided in the storage container 317.

The ingredient feeder M may further include a mixture guide configured to guide the mixture produced in the processors 310, 320 and 330 into the space portion of the ingredient feeder 300.

The mixture guide may be connected to the storage container 317 and may guide the mixture of the storage container 317 to a plurality of space portions formed in the ingredient mold.

When the ingredient feeder 300 includes a plurality of processors 310, 320 and 330, the ingredient feeder 300 may include a plurality of mixture guides 341, 342 and 343. The plurality of processors 310, 320 and 330 may correspond to the plurality of mixture guides 341, 342 and 343 in one to one correspondence.

The plurality of mixture guides 341, 342, and 343 may include a first mixture guide 341 connected to the storage container 317 of the solid ingredient processor 310, a second mixture guide 342 connected to the storage container 317 of the powder ingredient processor 320, and a third mixture guide 343 connected to the storage container 317 of the liquid ingredient processor 330.

The first mixture guide 341, the second mixture guide 342, and the second mixture guide 343 will be referred to as the mixture guides 341, 342, and 343 when describing the common configuration.

The mixture guides 341, 342 and 343 may include a common guide 344 connected to the processors 310, 320 and 330, and a plurality of branch guides 345 branching from the common guide 344. The plurality of branch guides 345 may disperse the mixture guided through the common guide 344.

The ingredient feeder 300 may further include a feed valve disposed in the processor or the mixture guide.

The feed valve may be disposed at the mixture outlet formed in the storage container 317 of the processor, and may be disposed between the mixture outlet and the common guide 314, or may be disposed at the common guide 314.

The feed valve may allow the mixture of the processor to be supplied to the ingredient mold 360 and prevent the mixture of the processor from being supplied to the ingredient mold 360. One example of the feed valve may be a solenoid valve. However, the feed valve of the present disclosure is not limited to the solenoid valve, but various types of feed valves may be used as long as the feed valves can control the mixture in the storage container 317.

When the ingredient mold 360 includes a plurality of processors 310, 320 and 330, the feed valve may be provided for each of the processors 310, 320 and 330. The plurality of processors 310, 320, and 330 may include a first feed valve 351 configured to control the mixture produced by the solid ingredient processor 310, a second feed valve 352 configured to control the mixture produced by the powder ingredient processor 320, and a third feed valve 353 configured to control the mixture produced by the liquid ingredient processor 330. The first feed valve 351, the second feed valve 352, and the third feed valve 353 will be described as the feed valves 351, 352, and 353 when explaining the common configuration.

The ingredient mold 360 cools the food ingredient into a solid ingredient, in which the mixture of the food ingredient and water processed in the processors 310, 320 and 330 may be cooled by the ingredient mold 360, and processed into a solid processed ingredient M having a predetermined shape. Since the solid processed ingredient is in a solid state, the solid processed ingredient will be referred to as a solid ingredient (B) below.

When a plurality of processors 310, 320 and 330 are provided, the number of ingredient molds 360 may be smaller than the number of processors 310, 320 and 330. One ingredient mold 360 may cool the mixtures produced in the plurality of processors 310, 320 and 330 together.

Meanwhile, the present disclosure is not limited to one ingredient mold 360, but may include a plurality of ingredient molds. The ingredient mold may be provided for each of the processors 310, 320 and 330. Hereinafter, the description will be made with respect to one ingredient mold 300 for the sake of convenience.

The space defined by the space portions of the ingredient mold 360 may be a mold space for freezing the mixture into a predetermined shape. The ingredient mold 360 may have a three-dimensional shape, and the space portion may be formed on one surface of the ingredient mold 360.

The mold space may be formed in the ingredient mold 360 for each of the plurality of processors, and a plurality of space portions may be provided in the ingredient mold 360. The plurality of space portions may be formed together on one surface of the ingredient mold 360. The plurality of space portions may be formed on the top surface of the ingredient mold 360.

When the ingredient mold 360 includes the first, second and third processors 310, 320 and 330, the ingredient mold 360 may be formed with a plurality of first space portions 362 having a space 361 in which the mixture supplied from the first processor 310 is accommodated, a plurality of second space portions 364 having a space 363 in which the mixture supplied from the second processor 320 is accommodated, and a plurality of third space portions 366 having a space 365 in which the mixture supplied from the third processor 330 is accommodated.

The plurality of first space portions 362 may correspond to the plurality of branch guides 345 of the first mixture guide 341 in one to one correspondence, and the mixture passing through the first mixture guide 341 may be dispersively accommodated in the plurality of first space portions 362.

The plurality of second space portions 364 may correspond to the plurality of branch guides 345 of the second mixture guide 342 in one to one correspondence, and the mixture passing through the second mixture guide 342 may be dispersively accommodated in the plurality of second space portions 364.

The plurality of third space portions 366 may correspond to the plurality of branch guides 345 of the third mixture guide 343 in one to one correspondence, and the mixture passing through the third mixture guide 343 may be dispersively accommodated in the plurality of third space portions 366.

The plurality of first space portions 362, the plurality of second space portions 364, and the plurality of third space portions 366 may have the same shape and size, and the plurality of first space portions 362, the plurality of second space portions 364, and the plurality of third space portions 366 may be described as space portions 362, 364 and 366 when explaining the common configuration.

The shape of the solid ingredient may be determined by the shape of the space portions 362, 364 and 366, and the space portions 362, 364 and 366 may have sectional shapes of circular balls or elliptical balls.

The space portions 362, 364, 366 may have sectional shapes of semi-circles or arcs, in particular, major arcs.

The ingredient mold 360 may include a coating layer 367 formed on the space portions 362, 364, 366. The coating layer 367 may be one selected from the group consisting of titanium, marble and diamond. The coating layer 367 may be formed in each of the plurality of space portions 362, 364 and 366, and may have the shape the same as the space portions 362, 364 and 366. If the ingredient mold 360 includes the coating layer 367, the space in which the mixture is accommodated may be substantially defined by the coating layer 367.

The ingredient feeder 300 may further include a cooler 370 configured to cool the ingredient mold 360.

Cooler 370 may include a thermoelectric element secured to the ingredient mold 360.

The cooler 370 may be disposed on the side or the bottom of the ingredient mold 360. The ingredient mold 360 may be formed with a thermoelectric element accommodating groove into which the thermoelectric element is accommodated, and the thermoelectric element may be inserted into and accommodated in the thermoelectric element accommodating groove.

The ingredient feeder 300 may include a rotator 380 for rotating the ingredient mold 360. The rotator 380 may rotate the ingredient mold 360 in a plurality of directions different from each other.

The rotator 380 may three-dimensionally shake the ingredient mold 360. When the rotator 380 operates, the mixture contained in the space portions 362, 364 and 366 may three-dimensionally flow in the space portions 362, 364 and 366 while losing heat by the space portions 362, 364 and 366. Water components in the mixture may be embanked due to heat absorption of the ingredient mold 360, the shape of the space portions 362, 364 and 366, and the three-dimensional shaking of the ingredient mold 360.

If the heat absorption of the ingredient mold 360 and the shaking of the ingredient mold 360 continue for a predetermined time, the slush-type mixture that has been supplied to the space portions 362, 364 and 366 may be processed into a ball-shaped solid ingredient.

The rotator 380 includes a rotating shaft 381 connected to the ingredient mold 360, a first motor 382 for rotating the rotating shaft 381 in the first direction, and a second motor 383 for rotating the rotating shaft 381 in the second direction different from the first direction.

The rotating shaft 381 may be a horizontal shaft connected to one side of the ingredient mold 360.

The first motor 382 may rotate the ingredient mold 360 such that the ingredient mold 360 is tilted about a horizontal axis HA. When the first motor 382 is driven, the ingredient mold 360 may rotate forward and backward about the horizontal axis HA.

The second motor 383 may rotate the first motor 382 such that the first motor 382 and the ingredient mold 360 may rotate about the vertical axis VA. When the second motor 383 is driven, the first motor 382 and the ingredient mold 360 may rotate forward and backward about the vertical axis VA.

When the first motor 382 is driven, if the second motor 383 is driven together, the ingredient mold 360 may be tilted about the vertical axis VA, and the ingredient mold 360 may cool the mixture M contained in the space portions 362, 364 and 366 into a ball shape while gently rolling the mixture M.

The rotator 380 may turn over the ingredient mold 360. The rotator 380 may turn over the ingredient mold by 180° about the horizontal axis HA such that the surface (for example, the upper surface) on which the space portions 362, 364 and 366 of the ingredient mold 360 are formed faces downward. When the surface of the ingredient mold 360 on which the space portions 362, 364, and 366 are formed faces downward, the ball-shaped solid ingredient B accommodated in the space portions 362, 364 and 366 may fall downward.

The rotator 380 may stop the operation of the second motor 383 when the first motor 382 and the second motor 383 have been driven for a predetermined time. In addition, after the operation of the second motor 383 is stopped, the first motor 382 may rotate the rotating shaft 381 by 180° and then restore the rotating shaft 181.

An exciter 390 may be installed on the ingredient mold 360. The exciter 390 may apply a vibration to the ingredient mold 360 so prevent the mixture cooled in the space portions 362, 364 and 366 from being attached to the space portions 362, 364 and 366. The exciter 390 may be installed on one side of the ingredient mold 360. The ingredient mold 360 may be formed with an exciter receiving groove in which the exciter 390 is accommodated, and the exciter 390 may be inserted into and accommodated in the exciter receiving groove. One example of the exciter 390 may include a high frequency generator fixed to the ingredient mold 360. Meanwhile, the exciter 390 is not limited to the high frequency generator, and various types of exciters can be used as long as the exciters can excite the ingredient mold 360.

The processors 310, 320 and 330 and the ingredient mold 360 may constitute a processing module for processing the food material into the solid ingredient, and the solid material processed in the processing module may be temporarily stored in the storage container.

The ingredient feeder 300 may include a common storage container 410 in which the solid ingredient transferred from the ingredient mold 360 is stored.

The common storage container 410 may include a barrier 412 that divides the common storage container 410 into a plurality of storage spaces such that storage spaces are formed for each of the processors 310, 320, and 330.

The common storage container 410 may be spaced apart from the ingredient mold 260 in the vertical direction at the lower portion of the ingredient mold 260. When the upper surface of the ingredient mold 260 faces downward, the ball-shaped solid ingredient B falling down from the space portions 362, 364 and 366 of the ingredient mold 260 may fall into the common storage container 410.

The common storage container 410 may be formed with an opening 413 at the lower side of the storage space, in which the ball-shaped solid ingredient falls into the opening 413. The openings 413 may be formed for each storage space, and the number of the openings 413 may be equal to the number of storage spaces.

The ingredient feeder 300 may not include the common storage container 410 separately. In this case, the solid ingredient B falling onto the ingredient mold 360 may fall down toward the storage space 424 of the storage containers 421, 422, and 423 described below.

The ingredient feeder 300 may be formed with an ingredient port 462 for discharging the processed ingredient. The ingredient feeder 300 may process the ingredient such that the ingredient has a size smaller than a sectional area of the ingredient channel P, and then discharge the processed ingredient B to the ingredient port 462.

The robot arm 200 shown in FIGS. 4 and 5 may receive the solid ingredient B from the ingredient port 462, and the supplied solid ingredient may be guided to the ingredient channel P.

The robot arm 200, in particular, the ingredient inlet 281 of the ingredient channel P may be connected to the ingredient port 462 of the ingredient feeder 300. The ingredient processed in the ingredient feeder 300 may be supplied to the ingredient channel P through the ingredient port 462 and the ingredient inlet 281.

The ingredient feeder 300 may include a transfer module (or dispenser module) for moving the ball-shaped solid ingredient B processed in the ingredient mold 260 to the robot arm 200.

The ingredient feeder 300 may further include at least one storage container in which the solid ingredient moved from the ingredient mold 260 is contained.

The ingredient feeder 300 may include a plurality of storage containers 421, 422, and 423. The plurality of storage containers 421, 422, and 423 may include a first storage container 421 in which an ingredient processed in the first space portion 362 is accommodated. The plurality of storage containers 421, 422, and 423 may include a second storage container 422 in which the ingredient processed in the second space portion 364 is accommodated. The plurality of storage containers 421, 422, and 423 may include a third storage container 423 in which the ingredient processed in the third space portion 366 is accommodated.

The plurality of storage containers 421, 422, and 423 may be spaced apart from each other. The plurality of storage containers 421, 422, 423 may be spaced apart from each other in the horizontal direction. The first storage container 421, the second storage container 422, and the third storage container 423 may have the same structure and shape. In the following description, the first, second and third storage containers may be described as the storage containers 421, 422, and 423 when explaining the common configuration.

Storage spaces 424 in which the solid ingredient B is stored may be formed in the storage containers 421, 422, and 423. An upper portion of the storage space 424 may have a shape that gradually narrows downward. The storage containers 421, 422, and 423 may include an upper storage part 425 having a size gradually reduced downward and a trapezoidal sectional shape. The solid ingredient moved from the ingredient mold 260 to the storage containers 421, 422 and 423 may be temporarily stored in the storage space 424.

The solid ingredient B falling down from the ingredient mold 260 or the common storage container 410 may be directly dropped into the storage containers 421, 422, and 423, and moved to the storage containers 421, 422, and 423 while being guided by a separate guide.

The ingredient feeder 300 may further include a guide for guiding the solid ingredient dropped from the ingredient mold 260 into the storage space 424. The guide may be disposed between the ingredient mold 260 and the storage container. The guide may have an inclined surface 429a inclined toward the storage space 424. The inclined surface 429a may be an upper surface of the guide. The guide may be placed on the storage container while being tilted. A lower end of the guide may face the storage space 424.

The guide may be rotatably disposed on the storage container, and may be rotated to open or close the opening 434 of the cooling chamber 430 which will be described below. The guide may be connected to a rotator 429b such as a motor capable of rotating the guide. The rotator 429b may rotate the guide such that a lower end of the guide faces the storage space 242, and may rotate the guide to seal the opening 434 by blocking the opening 434.

The ingredient mold 300 may include a plurality of guides 426, 427 and 428. The plurality of guides 426, 427, and 428 may be provided for the storage containers 421, 422, and 423, respectively. The guides 426, 427 and 428 may correspond to the storage containers 421, 422, and 423 in one to one correspondence.

The plurality of guides 426, 427, and 428 may include a first guide 426 for guiding the solid ingredient to the first storage container 421, a second guide 427 for guiding the solid ingredient to the second storage container 422, and a third guide 428 for guiding the solid ingredient into the third container 423.

The ingredient feeder 300 may further include a cooling chamber 430 in which the storage container is accommodated while being kept in a low temperature condition. The cooling chamber 430 may have a cooling space 432 to accommodate the storage container.

The cooling chamber 430 may be an adiabatic chamber having a cooling space 432 formed therein, and may be formed at an upper portion thereof with an opening 434 through which the solid ingredient passes.

The ingredient mold 360 may be disposed on the cooling chamber 340 while being spaced apart from the storage container.

The cooling chamber 430 may have an opening 434 formed at an upper portion of the storage container.

The opening 434 may be formed between the ingredient mold 360 and the storage container in the cooling chamber 430, and the solid ingredient falling down from the ingredient mold 36 may move to the storage containers 421, 422 and 433 by passing through the opening 434.

The opening 434 may be formed for each of the storage containers 421, 422, 433. The cooling chamber 430 may include a first opening formed above the first storage container 421, a second opening formed above the second storage container 422, and a third opening formed above the third storage container 423.

The ingredient feeder 300 may further include a cooler 440 that can cool the storage container. The cooler 440 may be installed to cool the cooling space 432. The cooler 440 may be configured as a refrigeration cycle apparatus including a compressor, a condenser, an expansion device, and an evaporator, and may also be configured as a thermoelectric element including a heat absorption body 441 and a heat dissipation body 442.

The ingredient feeder 300 may further include a cooling fan 443 which circulates the air in the cooling chamber 430 to the evaporator or the heat absorption body and then circulates the air into the cooling chamber 430.

In the ingredient feeder 300, the evaporator or the heat absorption body may be attached to the storage container such that the evaporator or the heat absorption body can absorb the heat of storage container in a conductive manner.

Ingredient feeder 300 may include a feed tube 460. The feed tube 460 may be formed with an ingredient port 462 and a passage 463 to guide the ingredient to the ingredient port 462.

The feed tube 460 may be inclined in a direction that is gradually lowered toward the ingredient port 462.

The passage 433 may be a space in which the solid ingredient may be moved, or may be a space in which the solid ingredient may be temporarily received/stored. The solid ingredient B stored in the storage container may be moved to the feed tube 360 and stored in the feed tube 360, and then moved to the outside through the ingredient port 462 of the feed tube 360.

The ingredient feeder 300 may further include a solid ingredient transfer device for forcibly moving the solid ingredient. The solid ingredient transfer device may forcibly move the solid ingredient B in the feed tube 460 toward the ingredient port 462.

One example of the solid ingredient transfer device may include a push body movably accommodated in the feed tube 360 to push the solid ingredient in the feed tube 460, and a linear moving device, such as a motor, connected to the push body to linearly move the feed tube 360.

The push body may move forward in the direction in which the ingredient port 462 is located to push the solid ingredient in the feed tube 360 towards the ingredient port 462. The push body may be retracted in the direction opposite to the ingredient port 462.

Another example of the solid ingredient transfer device may be a feeder 470 that supplies a high pressure fluid to the passage 463 such that the solid ingredient in the passage 463 is moved by the high pressure fluid.

The ingredient feeder 300 may include a feeder 470 for moving the solid ingredient moved to the feed tube 460 to the ingredient port 462. The feeder 470 may move the solid ingredient to the ingredient port 462 by the pressure of the air, and an example of the feeder 470 may include a blower for supplying air to the passage 463. The blower may be disposed opposite to the ingredient port to provide pneumatic pressure to the passage. For the sake of convenience, the feeder and the blower will be denoted with reference numeral 470.

The blower 470 may be installed opposite to the ingredient port 462 and may flow high pressure air into the passage 463. The high pressure air flowing from the blower 470 into the passage 463 can function as a solid ingredient carrier that causes the solid ingredient in the passage 463 to flow toward the ingredient port 462.

The ingredient feeder 300 may further include a transfer tube connecting the storage containers 421, 422 and 423 and the feed tube 460. The transfer tube may guide the solid ingredient B stored in the storage container to the passage 463 of the feed tube 460. An upper portion of the transfer tube may be connected to the storage container, a lower portion of the transfer tube may be connected to the feed tube 460 and the solid ingredient in the storage container may be moved to the passage 463 of the feed tube 460 by passing through the transfer tube.

A plurality of transfer tubes may be provided and the plurality of transfer tubes may correspond to the storage containers 421, 422, and 423 in one to one correspondence. The plurality of transfer tubes may include a first transfer tube 471 connecting the first storage container 421 and the feed tube 460, a second transfer tube 472 connecting the second storage container 422 and the feed tube 460, and a third transfer tube 473 connecting the third storage container 423 and the feed tube 460.

Hereinafter, the first transfer tube 471, the second transfer tube 472, and the third transfer tube 473 will be described as the transfer tubes 471, 472, and 473 when explaining the common configuration.

Each of the plurality of transfer tubes 471, 472 and 473 may include a connection terminal 474 connected to the feed tube 460. The connection terminals 474 of the plurality of transfer tubes 471, 472, and 473 may be spaced apart from each other in the longitudinal direction of the feed tube 460.

The plurality of storage containers 421, 422, and 423 may be arranged in parallel to each other to have the same height, and the plurality of transfer tubes 471, 472, and 473 may have lengths which increase as they are closer to the ingredient port 462.

The ingredient feeder 300 may further include a control valve for controlling the drop of the solid ingredient located in the storage container.

The control valve may open or close the interior of the transfer tubes 471, 472 and 473 in the movement direction of the solid ingredient.

When the ingredient feeder 300 includes a plurality of storage containers 421, 422, and 423, the ingredient feeder 300 may include a plurality of control valves 476, 477, and 478. The plurality of control valves 476, 477, and 478 may include a first control valve 476 to control the solid ingredient moved to the first transfer tube 471, a second control valve 477 to control the solid ingredient moved to the second transfer tube 472, and a third control valve 478 to control the solid ingredient moved to the third transfer tube 473.

Hereinafter, the first control valve 476, the second control valve 477 and the third control valve 478 will be described as the control valves 476, 477 and 478 when explaining the common configuration.

The control valves 476, 477 and 478 may be disposed at the outlet of the storage containers 421, 422 and 423 or at the top of the transfer tube.

The control valves 476, 477 and 478 may be opened and closed for a time during which the plurality of solid ingredients in the storage container drop one by one.

The controller 180 may count the number of operations of the control valves 476, 477 and 478. The controller 180 may stop the opening/closing operation of the control valve to stop the input of the ingredient when the number of times of the operation is equal to or more than the preset number of times.

The ingredient feeder 300 may further include an intermediate valve disposed at a lower portion of the transfer tube. The intermediate valve may be an elastic plug that opens the transfer tube while being deformed by the solid ingredient dropped from the storage container.

The intermediate valve may be a one-way valve that prevents air in the feed tube 460 from entering the transfer tubes 471, 472 and 473, and allows the solid ingredient in the transfer tubes 471, 472 and 473 to move to the feed tube 460.

A plurality of intermediate valves may be provided, and the plurality of intermediate valves may be provided for each of the transfer tubes 471, 472, and 473. The plurality of intermediate valves may include a first intermediate valve 481 disposed in the first transfer tube 471, a second intermediate valve 482 disposed in the second transfer tube 472, and a third intermediate valve 483 disposed in the third transfer tube 473.

The ingredient feeder 300 may further include a variable stopper 490. The variable stopper 490 may be disposed in the passage 464. The variable stopper 490 may prevent the solid ingredient from moving to the ingredient outlet 362 when the operation of the feeder 470 is stopped. The variable stopper 490 may allow the solid ingredient to move to the ingredient port 462 during the operation of the feeder 470.

The variable stopper 490 may be a valve device that is opened or closed by the feeder 470.

The variable stopper 490 may include a stopper 492 and a spring 494.

The stopper 492 may be rotatably disposed in the passage 463.

The spring 494 may elastically support the stopper 492 such that the stopper 492 rotates in the direction of blocking the passage 463.

The variable stopper 490 may further include a limiter 496 disposed in the passage 463 and latched when the stopper 492 is in a direction of blocking the passage 463.

The feeder 470 may include a blower for blowing air having a preset pressure or above to the stopper 492. The preset pressure may be a pressure that causes the stopper 492 to rotate in the direction of opening the passage 463.

Figure 7:
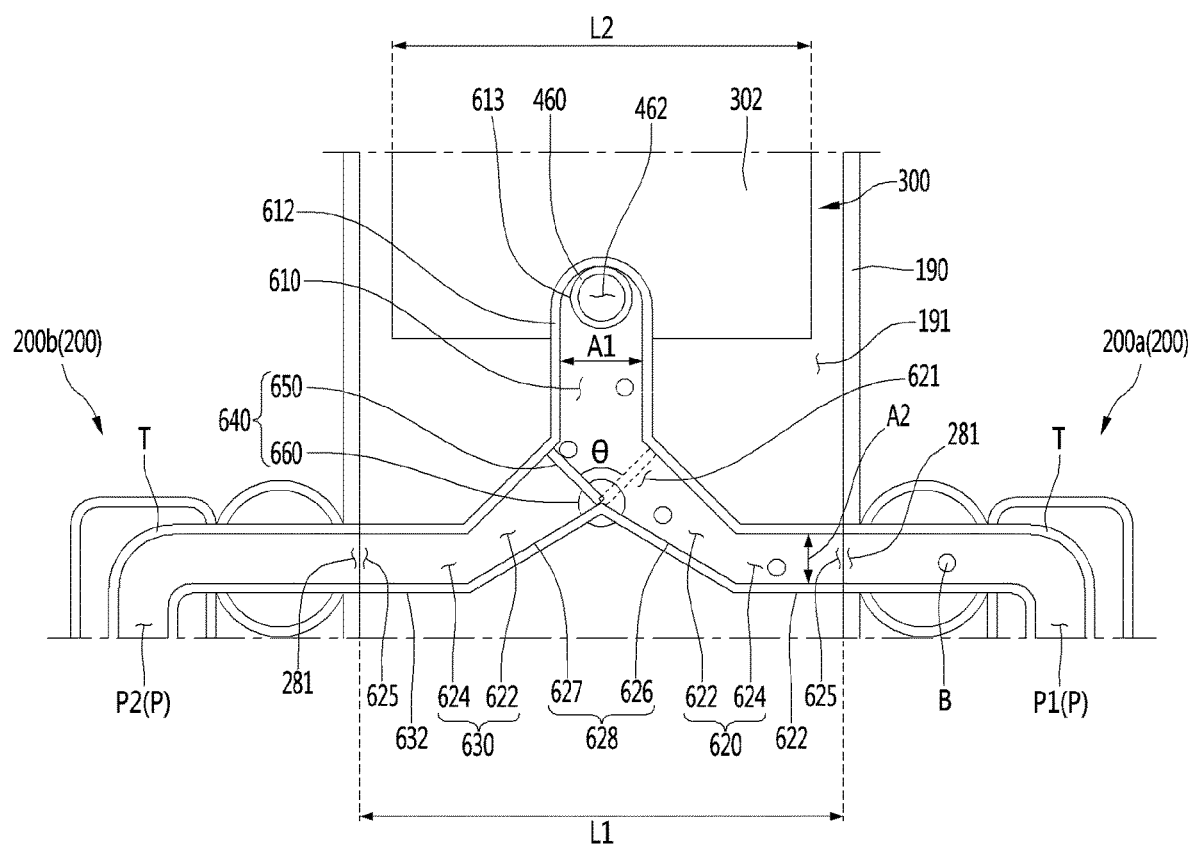
FIG. 7 is an enlarged view of a dispenser when an example of a robot according to an embodiment guides an ingredient to a first robot arm.
Figure 8:
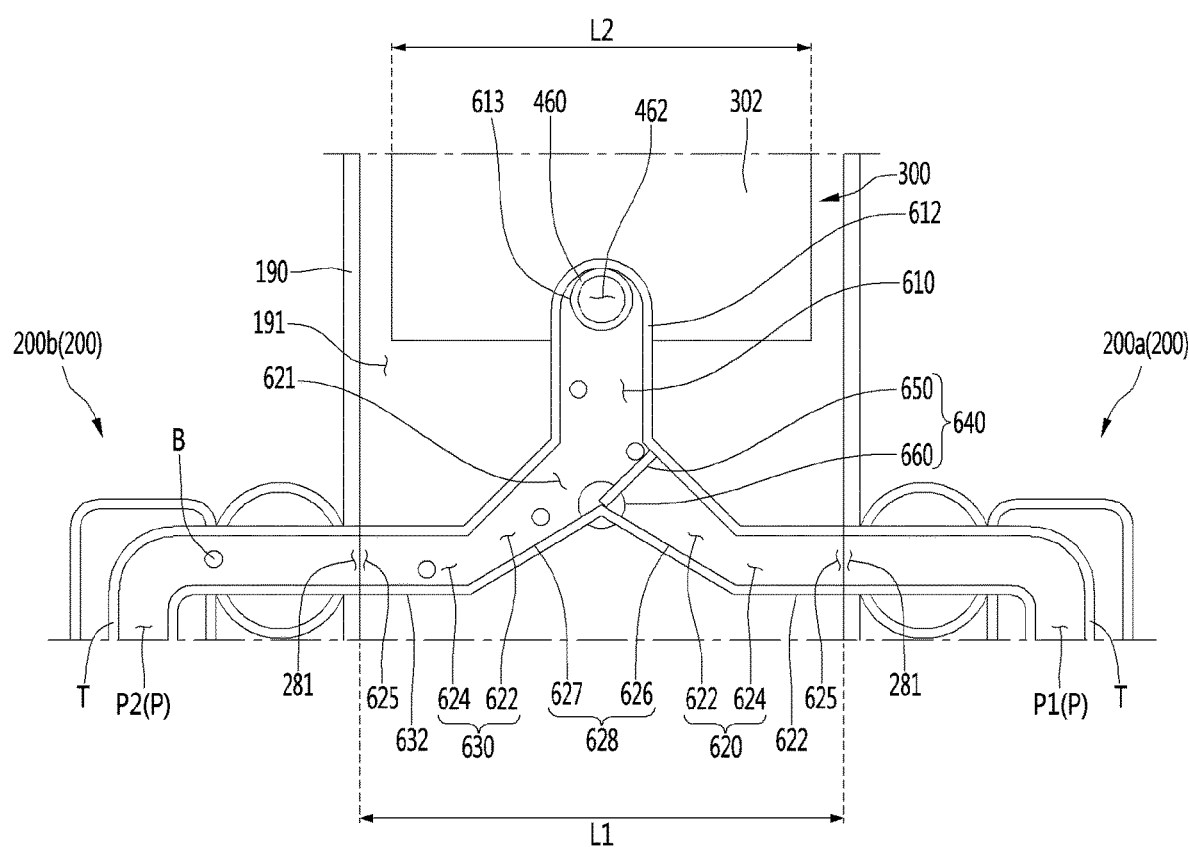
FIG. 8 is an enlarged view of a dispenser when an example of a robot according to an embodiment guides an ingredient to a second robot arm.

FIG. 7 is an enlarged view of a dispenser when an example of a robot according to an embodiment guides an ingredient to a first robot arm, and FIG. 8 is an enlarged view of a dispenser when an example of a robot according to an embodiment guides an ingredient to a second robot arm.

The common channel 610 may be formed by an upper guide 612 vertically extending in the space 191 of the robot body 190. The upper guide 612 may be a hollow cylindrical shape which is open in a vertical direction, and the common channel 610 may be a passage formed inside the upper guide 612.

The upper end of the upper guide 612 may be blocked, the feed tube 460 of the ingredient feeder 300 may penetrate through a tube through-hole 613 formed in the upper portion of the upper guide 612, and the ingredient port 462 of the feed tube 460 may face the common channel 610.

The first branch channel 620 may be connected to the lower portion of the upper guide 612 and may be formed by a first side guide 622 extending toward the first robot arm 200a. The first side guide 622 may have a hollow cylindrical shape with both opened ends and may be bent at least once. The first branch channel 620 may be formed in the first side guide 622.

The second branch channel 630 may be connected to the lower portion of the upper guide 612 and may be formed by a second side guide 632 extending toward the second robot arm 200b. The second side guide 632 may have a hollow cylindrical shape with both opened ends and may be bent at least once. The second branch channel 630 may be formed in the second side guide 632.

The first branch channel 620 and the second branch channel 630 may have the same shape and size and may be symmetrically provided.

Each of the first branch channel 620 and the second branch channel 630 may include an inclined channel 622 having an inlet 621 formed therein and a horizontal channel 624 extending from the inclined channel 622 in a horizontal direction. Each of the first branch channel 620 and the second branch channel 630 may include an outlet 625. The outlet 625 may be defined as a region of the horizontal channel 624 facing the ingredient inlet 261 of the robot arm 200.

The inlet 621 of each of the first branch channel 620 and the second branch channel 630 may be located below the common channel 610, and the inlet 621 may be open toward the common channel 610.

A horizontal length L1 between the outlet 625 of the first branch channel 620 and the outlet 625 of the second branch channel may be greater than the horizontal length L2 of the ingredient feeder 300.

The outlet 625 of the first branch channel 620 and the outlet 625 of the second branch channel 630 may face in the opposite directions. The outlet 625 of the first branch channel 620 may face the left side and face the ingredient channel P1 of the robot arm 200a located at the left side of the robot body 190.

The outlet 625 of the second branch channel 630 may face the right side and face the ingredient channel P2 of the robot arm 200b located at the right side of the robot body 190.

The dispenser 600 may include a variable ingredient guide 640 capable of changing the guide direction of the ingredient.

The variable ingredient guide 640 may enable the first branch channel 620 and the second branch channel 630 to selectively communicate with the common channel 610, and the ingredient, which has passed through the common channel 610, may be guided to the first branch channel 620 or the second branch channel 630.

The variable ingredient guide 640 may perform both a function for guiding the ingredient and a function for opening the first and second branch channels 620 and 630. The variable ingredient guide 640 may selectively perform a first feed mode for guiding the ingredient to the first branch channel 620 and closing the second branch channel 630 as shown in FIG. 7 and a second feed mode for guiding the ingredient to the second branch channel 630 and closing the first branch channel 620 as shown in FIG. 8.

The variable ingredient guide 640 may include a guide plate 650 and a rotator 660.

The guide plate 650 may block any one of the first branch channel 620 and the second branch channel 630 and guide the ingredient dropped from the common channel 610 to the other of the first branch channel 620 and the second branch channel 630.

The rotator 660 may be connected to the guide plate 650 to rotate the guide plate 650. The rotator 660 may include a motor connected to the rotation center of the guide plate 650 to rotate the guide plate 650. If the rotator 660 can rotate the guide plate 650, the type thereof is not limited thereto and a reducer disposed between the motor and the guide plate may be further included.

The dispenser 600 may include a center guide 628 located below the common channel 610 and including formed therein a first inclined surface 626 and a second inclined surface 627 guiding the ingredient dropped from the common channel 610 in opposite directions.

The center guide 628 may have a mountain cross-sectional shape.

A portion, in which the first inclined surface 626 is formed, of the center guide 628 may be a left inclined guide forming an inclined channel 622 of the first side guide 622.

A portion, in which the second inclined surface 627 is formed, of the center guide 628 may be a right inclined guide forming an inclined channel 622 of the second side guide 632.

The guide plate 650 may be rotatably disposed above the center guide 628.

The rotator 660 may rotate the guide plate 650 in an obtuse angle range θ.

The cross-sectional area A1 of each of the first branch channel 620 and the second branch channel 630 may be less than the cross-sectional area A2 of the common channel 610.

Figure 9:
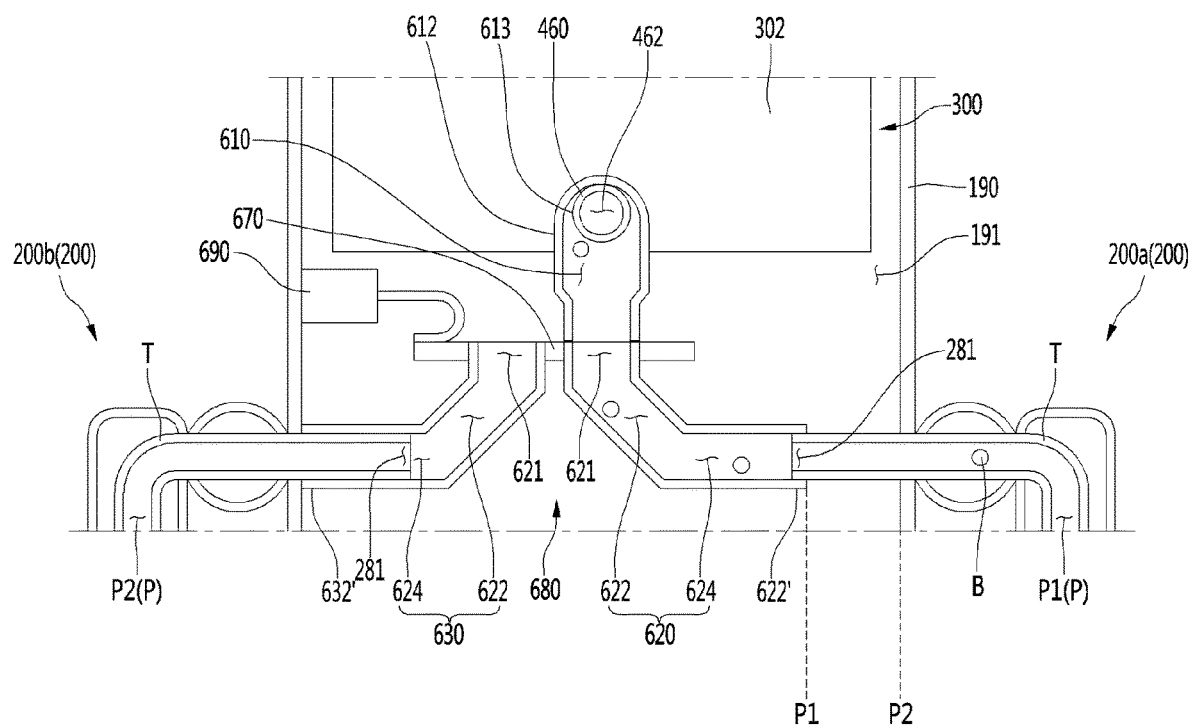
FIG. 9 is an enlarged view of a dispenser when another example of a robot according to an embodiment guides an ingredient to a first robot arm.
Figure 10:
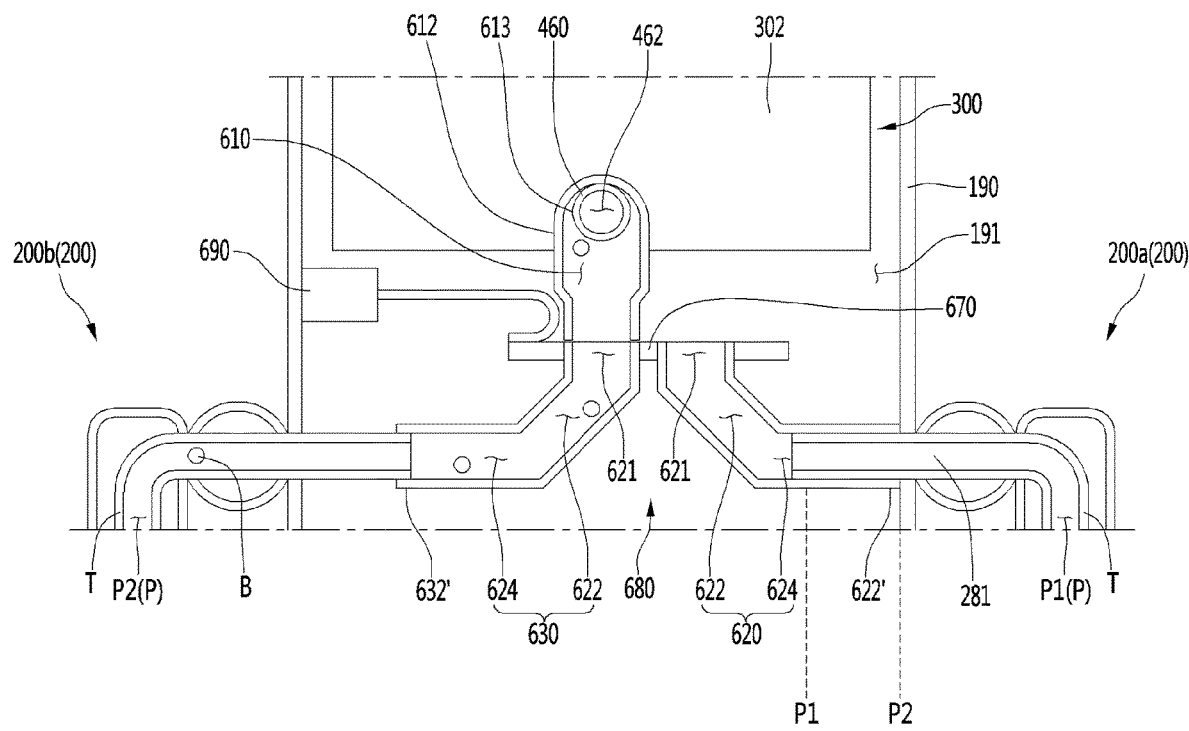
FIG. 10 is an enlarged view of a dispenser when another example of a robot according to an embodiment guides an ingredients to a second robot arm.

FIG. 9 is an enlarged view of a dispenser when another example of a robot according to an embodiment guides an ingredient to a first robot arm, and FIG. 10 is an enlarged view of a dispenser when another example of a robot according to an embodiment guides an ingredient to a second robot arm.

The first branch channel 620 and the second branch channel 630 may be connected via a center connector 670.

The first branch channel 620 may be formed by a first side guide 622' disposed to move toward the first robot arm 200a. The first side guide 622' may have a hollow cylindrical shape with both opened ends and may be bent at least once. The first branch channel 620 may be formed in the first side guide 622'.

the second branch channel 630 may be formed by a second side guide 632' disposed to move toward the second robot arm 200a. The second side guide 632' may have a hollow cylindrical shape with both opened ends and may be bent at least once. The second branch channel 630 may be formed in the second side guide 632'.

An assembly 680 of the first branch channel 620, the second branch channel 630 and the connector 670 may be movably disposed in the space 191 of the robot body 190.

The robot may further include a mover 690 for moving the assembly. The mover 690 may move the assembly 680 such that the first branch channel 620 and the second branch channel 630 selectively communicate with the common channel.

The mover 690 may move the assembly 680 to a first position where the first branch channel 620 communicates with the common channel 610, as shown in FIG. 9.

The mover 690 may move the assembly 680 to a second position P2 where the second branch channel 630 communicates with the common channel 610, as shown in FIG. 10.

The mover 690 may be connected to the first branch channel 620 or the second branch channel 630 and thus may be connected to the first side guide 622' forming the first branch channel 620 or may be connected to the second side guide 622' forming the second branch channel 630.

The mover 690 may include a linear motor connected to the first side guide 622' or the second side guide 632'. The type of the mover is not limited thereto if the mover may linearly move the assembly 680.

As shown in FIG. 9, the first side guide 622' may be move away from the first robot arm 200a. At this time, the inlet 621 of the first branch channel 620 may communicate with the common channel 610 in the vertical direction.

As shown in FIG. 9, the second side guide 632' may become close to the second robot arm 200b. At this time, the inlet 621 of the second branch channel 630 may not communicate with the common channel 610 in the vertical direction.

As shown in FIG. 10, the first side guide 622' may become close to the first robot arm 200a. At this time, the inlet 621 of the first branch channel 620 may not communicate with the common channel 610 in the vertical direction.

As shown in FIG. 10, the second side guide 632' may move away from the second robot arm 200b. At this time, the inlet 621 of the second branch channel 630 may communicate with the common channel 610 in the vertical direction.

Figure 11:
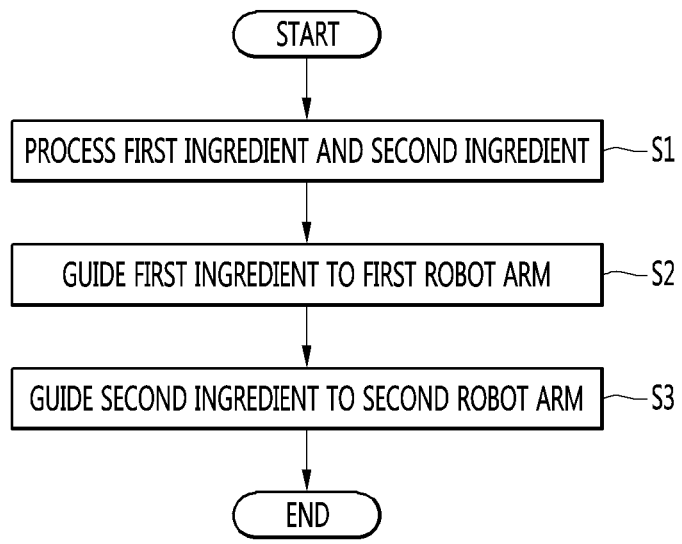
FIG. 11 is a view showing an example of controlling a robot according to an embodiment.

FIG. 11 is a view showing an example of controlling a robot according to an embodiment.

The method of controlling the robot may control the robot, and the robot may include an ingredient feeder M installed in the robot body 190 to feed the ingredient; first and second robot arms 200a and 200b connected to the robot body 190 and each having formed therein an ingredient channel, through which the ingredient passes; and a dispenser 600 for dispensing the ingredient received from the ingredient feeder 300 to the first and second robot arms 200a and 200b.

A user may introduce ingredients through ingredient introduction ports 311, 312 and 313 of a plurality of processors 310, 320 and 330, and input desired food information through the input unit 120.

The controller 180 may select one of a plurality of cooking schedules stored in the memory 170 according to cooking information input the input unit 120 or search for a cooking schedule according to cooking information input by the user using an artificial neural network and then store the cooking schedule in the memory 170.

The controller 180 may transmit a control signal for controlling the ingredient feeder 300 and a control signal for controlling the first and second robot arms 200a and 200b according to the cooking schedule stored in the memory 170.

The method of controlling the robot may include step S1 of processing a first ingredient and a second ingredient different from each other in the ingredient feeder M.

The plurality of processors 310, 320 and 330 of the ingredient feeder M may process different types of ingredients and feed the ingredients to the ingredient mold 360. For example, the first processor 310 of the plurality of processors 310, 320 and 330 may mix a solid ingredient with water and feed the mixture to the ingredient mold 360, and the ingredient mold 360 may cool and process the mixture of the solid ingredient and water into a first ingredient. The second processor 320 of the plurality of processors 310, 320 and 330 may mix a powdered ingredient with water and feed the mixture to the ingredient mold 360, and the ingredient mold 360 may cool and process the mixture of the powdered ingredient and water into a second ingredient. The third processor 330 of the plurality of processors 310, 320 and 330 may mix a liquid gradient with water and feed the mixture to the ingredient mold 360, and the ingredient mold 360 may cool and process the mixture of the liquid ingredient and water into a third ingredient.

The ingredient mold 360 may drop different types of ingredients, for example, a first ingredient, a second ingredient and a third ingredient as described above, and the first ingredient, the second ingredient and the third ingredient may be stored in the first storage container 421, the second storage container 422 and the third storage container 423 not to be mixed with one another.

As described above, when different types of ingredients have been independently moved to the first storage container 421, the second storage container 422 and the third storage container 423, step S1 of processing different types of ingredients at the ingredient feeder M may be finished.

The controller 180 may perform step S2 of guiding the first ingredient to the ingredient channel P1 of the first robot arm 200a and step S3 of guiding the first ingredient to the ingredient channel P2 of the second robot arm 200b with a time difference according to the cooking schedule.

The controller 180 may control the first control valve 476 in an open mode at the time of introduction of the first ingredient and drive the feeder 470 after the first control valve 476 is controlled in the open mode. In addition, the controller 180 may control the dispenser 600 in a first robot arm feed mode.

The first ingredient contained in the first storage container 421 may sequentially pass through the common channel 610, the first branch channel 620 and the first ingredient channel P1 of the first robot arm 200a after being moved to the feed tube 460, and the first robot arm 200a may introduce the first ingredient into the ingredient container F.

After the first ingredient is introduced, the controller 180 may control at least one of the first robot arm 200a or the second robot arm 200b according to the cooking schedule, and the first robot arm 200a and the second robot arm 200b may perform cooking operation according to a control signal received from the controller 180.

After the first ingredient is introduced or during the cooking operation of the first robot arm 200a and the second robot arm 200b, the second ingredient may be introduced, and the controller 180 may control the second control valve 477 in the open mode at the time of introduction of the second ingredient and drive the feeder 470 after the second control valve 477 is controlled in the open mode. In addition, the controller 180 may control the dispenser 600 in the second robot arm feed mode.

The second ingredient contained in the second storage container 422 may sequentially pass through the common channel 610, the second branch channel 630 and the second ingredient channel P2 of the second robot arm 200b after being moved to the feed tube 460, and the second robot arm 200b may introduce the second ingredient into the ingredient container F.

After the second ingredient is introduced, the controller 180 may control at least one of the first robot arm 200a or the second robot arm 200b according to the cooking schedule, and the first robot arm 200a and the second robot arm 200b may perform the cooking operation according to a control signal received from the controller 180.

When the cooking schedule includes introducing the third ingredient after introducing the first ingredient and introducing the second ingredient, the controller 180 may control the third control valve 478 of the third ingredient in the open mode and drive the feeder 470 after the third control valve 478 is controlled in the open mode. In addition, the controller 180 may control the dispenser 600 in the first robot arm feed mode or the second robot arm feed mode.

The robot may set an ingredient movement path of each ingredient according to the cooking schedule and the types of the plurality of ingredients, and the controller 180 may control the ingredient feeder 300, the dispenser 600 and the first and second robot arms 200a and 200b such that the ingredients are introduced through the set ingredient movement path.

Figure 12:
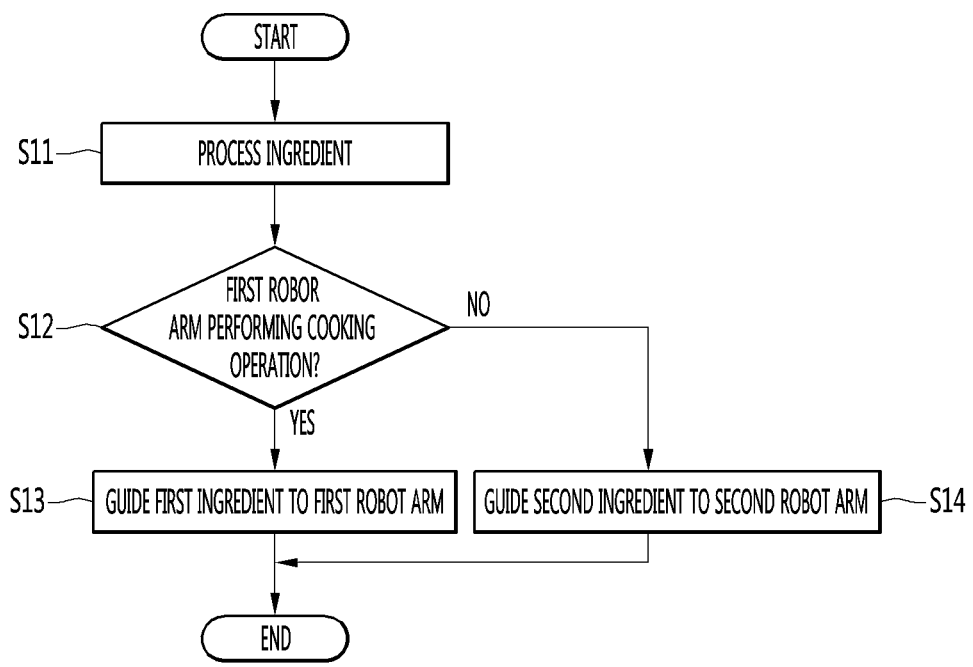
FIG. 12 is a view showing another example of controlling a robot according to an embodiment.

FIG. 12 is a view showing another example of controlling a robot according to an embodiment.

The method of controlling the robot may control the robot. The robot may include an ingredient feeder M installed in the robot body 190 to feed the ingredient; first and second robot arms 200a and 200b connected to the robot body 190 and each having formed therein an ingredient channel, through which the ingredient passes; and a dispenser 600 for dispensing the ingredient fed from the ingredient feeder 300 to the first and second robot arms 200a and 200b. Step S11 of processing the ingredient in the ingredient feeder 300 may be first performed.

Step S11 of processing the ingredient in the ingredient feeder 300 is equal or similar to step S1 of processing the ingredient in the ingredient feeder 300 of the example of the method of controlling the robot shown in FIG. 11 and thus a detailed description thereof will be omitted.

The controller 180 may control at least one of the first robot arm 200a or the second robot arm 200b according to the cooking schedule after the ingredient is processed by the ingredient feeder 300, and the first robot arm 200a and the second robot arm 200b perform cooking operation according to a control signal received from the controller 180.

The ingredient may be introduced during the cooking operation of the first robot arm 200a and the second robot arm 200b, and the controller 180 may select a robot arm which will introduce the ingredient from between the first robot arm 200a and the second robot arm 200b.

The method of controlling the robot may include steps S12 and S13 in which any one of the first robot arm 200a and the second robot arm 200b performs cooking operation at the time of introduction of the ingredient and the dispenser 600 guides the ingredient to the other of the first robot arm 200a and the second robot arm 200b.

When the first robot arm 200a is performing cooking operation according to the cooking schedule at the time of introduction of the ingredient, the controller 180 may determine the second robot arm 200b as a robot arm which will introduce the ingredient, and control the dispenser 600 in the second robot arm feed mode (S12)(S13).

In this case, the ingredient processed in the ingredient feeder 300 may be dropped into the ingredient container F after sequentially passing through the common channel 610, the second branch channel 630 and the second ingredient channel P2 of the second robot arm 200b.

Meanwhile, when the first robot arm 200a does not perform certain cooking operation according to the cooking schedule at the time of introduction of the ingredient, the controller 180 may determine the first robot arm 200a as a robot arm which will introduce the ingredient and control the dispenser 600 in the first robot arm feed mode (S12)(S14).

In this case, the ingredient processed in the ingredient feeder 300 may be dropped into the ingredient container F after sequentially passing through the common channel 610, the first branch channel 620 and the first ingredient channel P1 of the first robot arm 200a.

After the ingredient is introduced, the first robot arm 200a or the second robot arm 200b may perform the cooking operation again according to the cooking schedule.

According to the embodiment, the ingredient may be selectively guided through the first robot arm and the second robot arm, and, while the first robot arm performs cooking operation other than the ingredient introduction operation, the second robot arm may perform the ingredient introduction operation. Therefore, the first and second robot arms can perform various cooking operations and the ingredient may be introduced at an optimal ingredient introduction time.

In addition, different types of first and second ingredients may be independently introduced through the first and second robot arms with a time difference, thereby introducing the first ingredient and the second ingredient at optimal times in optimal states.

In addition, it is possible to determine an ingredient guide direction and an ingredient guide object, by a simple configuration including the common channel, the first and second branch channels and the variable ingredient guide.

In addition, it is possible to determine an ingredient guide direction and an ingredient guide object, by a simple configuration including the common channel, the first and second branch channels and the mover.

In addition, since water of the water tank of the robot body can be supplied to the ingredient feeder in the robot body, the ingredient feeder can process the ingredient while minimizing movement of the robot.

In addition, since the ingredient feeder can process a new ingredient while the first robot arm or the second robot arm performs cooking operation, it is possible to shorten the whole cooking time as compared to the case where the cooking operation of the first robot arm or the second robot arm and the ingredient processing of the ingredient feeder are performed with a time difference.

In addition, since water of the water tank disposed in the robot may be supplied to the ingredient feeder, it is possible to minimize the number of times that the robot moves to a water supply device such as a faucet in order to receive water used for the ingredient feeder.

In addition, the robot may include a battery and a driving wheel and thus move in a kitchen or a restaurant. It is possible to maximize the region in which the robot may perform the cooking operation and to perform various cooking operations using the robot.

The foregoing description is merely illustrative of the technical idea of the present disclosure and various changes and modifications may be made by those skilled in the art without departing from the essential characteristics of the present disclosure.

Therefore, the embodiments disclosed in the present disclosure are intended to illustrate rather than limit the technical idea of the present disclosure, and the scope of the technical idea of the present disclosure is not limited by these embodiments.

The scope of protection of the present disclosure should be construed according to the following claims, and all technical ideas falling within the equivalent scope to the scope of protection should be construed as falling within the scope of the present disclosure.

What is claimed is:

1. A robot comprising:
    a robot body;
    an ingredient feeder installed in the robot body to feed an ingredient;
    first and second robot arms each having an ingredient channel formed therein and connected to the robot body, the ingredient passing through the ingredient channel; and
    a dispenser disposed in the robot body to dispense the ingredient received from the ingredient feeder to the first and second robot arms,
    wherein the dispenser includes:
        a common channel connected to the ingredient feeder,
        a first branch channel communicating with the ingredient channel of the first robot arm, and
        a second branch channel communicating with the ingredient channel of the second robot arm,
    wherein the ingredient, which has passed through the common channel, is selectively fed to the first branch channel and the second branch channel by the dispenser,
    wherein the robot body comprises:
        a main body having a space formed therein: and
        a lower body formed below the main body,
    wherein the common channel, the first branch channel and the second branch channel are accommodated in the space of the main body, and
    wherein the lower body comprises:
        a driving motor; and
        a driving wheel connected to the driving motor and rotated by the driving motor.

2. The robot according to claim 1, wherein each of the first branch channel and the second branch channel includes:
    an inclined channel having an inlet formed therein, and
    a horizontal channel extending from the inclined channel in a horizontal direction.

3. The robot according to claim 1, wherein an inlet of each of the first branch channel and the second branch channel is located below the common channel.

4. The robot according to claim 1, wherein a horizontal length between an outlet of the first branch channel and an outlet of the second branch channel is greater than a horizontal length of the ingredient feeder.

5. The robot according to claim 1, wherein an outlet of the first branch channel and an outlet of the second branch channel face in opposite directions.

6. The robot according to claim 1, wherein the dispenser further includes a variable ingredient guide configured to enable the first branch channel and the second branch channel to selectively communicate with the common channel and guide the ingredient, which has passed through the common channel, to the first branch channel or the second branch channel.

7. The robot according to claim 6, wherein the variable ingredient guide includes:
    a guide plate configured to block any one of the first branch channel or the second branch channel and guide the ingredient dropped from the common channel to the other of the first branch channel or the second branch channel, and
    a rotator configured to rotate the guide plate.

8. The robot according to claim 7, wherein the dispenser further includes a center guide located below the common channel and having a first inclined surface and a second inclined surface formed therein, the first inclined surface and the second inclined surface guiding the ingredient dropped from the common channel in opposite directions.

9. The robot according to claim 8, wherein the guide plate is rotatably disposed above the center guide.

10. The robot according to claim 7, wherein the rotator rotates the guide plate in an obtuse angle range.

11. The robot according to claim 1, wherein the first branch channel and the second branch channel are connected via a center connector, and
    wherein an assembly of the first branch channel, the second branch channel and the center connector is movably disposed in the robot body.

12. The robot according to claim 11, comprising a mover configured to move the assembly to a first position where the first branch channel communicates with the common channel or a second position where the second branch channel communicates with the common channel.

13. The robot according to claim 11, wherein the mover is connected to the first branch channel or the second branch channel.

14. The robot according to claim 1, further comprising:
    a water tank disposed in the robot body; and
    a pump configured to pump water of the water tank to the ingredient feeder.

15. The robot according to claim 1, further comprising a battery disposed in the robot body.

16. The robot according to claim 1, wherein the ingredient feeder further includes a blower configured to feed a solid ingredient to the common channel.

17. The robot according to claim 16, wherein a cross-sectional area of each of the first branch channel and the second branch channel is less than a cross-sectional area of the common channel.

18. A method of controlling a robot including an ingredient feeder installed in a robot body to feed an ingredient, first and second robot arms connected to the robot body and each having formed therein an ingredient channel, through which the ingredient passes, and a dispenser configured to dispense the ingredient received from the ingredient feeder to the first and second robot arms, the method comprising:

processing the ingredient by the ingredient feeder; and performing cooking operation by any one of the first robot arm or the second robot arm and guiding the ingredient to the other of the first robot arm or the second robot arm.

\* \* \* \* \*